(12) United States Patent
Krich et al.

(10) Patent No.: US 8,358,239 B2
(45) Date of Patent: Jan. 22, 2013

(54) ITERATIVE CLUTTER CALIBRATION WITH PHASED ARRAY ANTENNAS

(75) Inventors: Steven Ira Krich, Lexington, MA (US); Ian Weiner, Braintree, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 108 days.

(21) Appl. No.: 13/070,566

(22) Filed: Mar. 24, 2011

(65) Prior Publication Data
US 2011/0241931 A1 Oct. 6, 2011

Related U.S. Application Data

(60) Provisional application No. 61/319,909, filed on Apr. 1, 2010.

(51) Int. Cl.
*G01S 7/40* (2006.01)
(52) U.S. Cl. .......................................................... 342/174
(58) Field of Classification Search .................... 342/174
See application file for complete search history.

(56) References Cited

U.S. PATENT DOCUMENTS

| | | | |
|---|---|---|---|
| 5,530,449 A | 6/1996 | Wachs et al. | |
| 5,539,412 A * | 7/1996 | Mendelson | 342/192 |
| 6,163,296 A | 12/2000 | Lier et al. | |
| 6,480,153 B1 * | 11/2002 | Jung et al. | 342/368 |
| 8,049,661 B1 * | 11/2011 | Loberger | 342/173 |

FOREIGN PATENT DOCUMENTS
EP  1981120 A1  10/2008

OTHER PUBLICATIONS

International Search Report and Written Opinion in international patent application No. PCT/US2011/029702, mailed Oct. 31, 2011, 8 pages.
Spall, "Multivariate Stochastic Approximation Using a Simultaneous Perturbation Gradient Approximation," IEEE Transactions on Automatic Control, vol. 37(3), pp. 332-341; 10 pgs.
Robbins et al, "A Stochastic Approximation Method," Annals of Mathematical Statistics, vol. 22, pp. 400-407; 8 pgs.
Spall; "Multivariate Stochastic Approximation Using a Simultaneous Perturbation Gradient Approximation;"IEEE Transactions on Automatic Control, vol. 37, No. 3; Mar. 1992; pp. 332-341.
Robbins et al.; "A Stochastic Approximation Method"; The Annals of Mathematical Statistics; vol. 22, No. 3; Sep. 1951; pp. 400-407.

* cited by examiner

*Primary Examiner* — Harry Liu
(74) *Attorney, Agent, or Firm* — Guerin & Rodriguez, LLP; William G. Guerin

(57) ABSTRACT

An iterative clutter calibration method comprises measuring an average of a sidelobe power in a range-Doppler image for a plurality of ranges. A determined value of an objective function is responsive to an average of the sidelobe clutter power. A plurality of beamformer weights is modified and the step of determining the value of the objective function is repeated until a maximum value of the objective function is determined. Each beamformer weight determines a gain and phase of a respective antenna element in an antenna system.

23 Claims, 23 Drawing Sheets

Fourier Transform

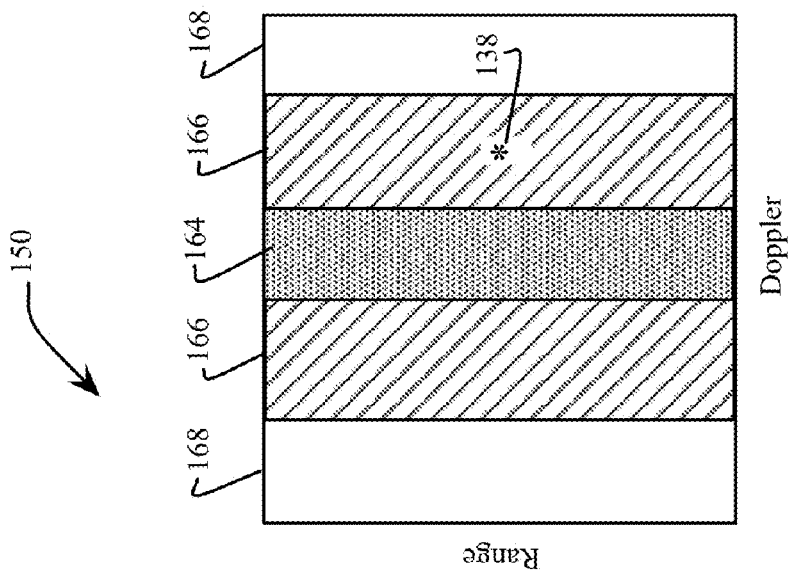
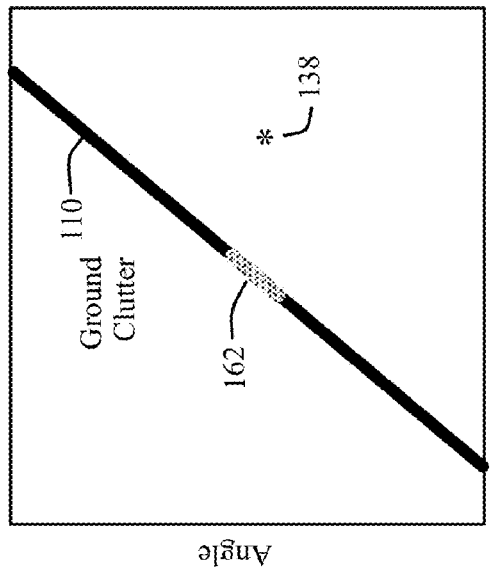
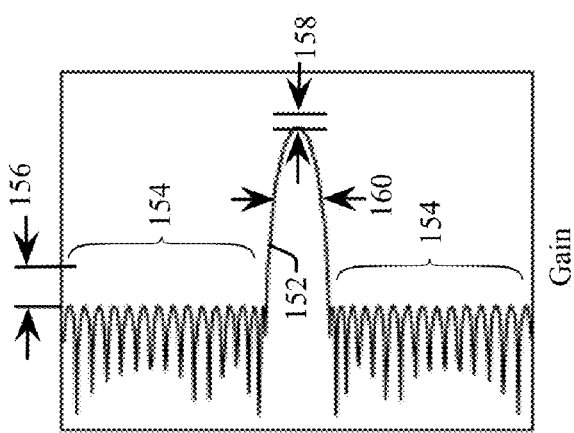
FIG. 8C
FIG. 8B
FIG. 8A

ITERATIVE CLUTTER CALIBRATION WITH PHASED ARRAY ANTENNAS

CROSS-REFERENCE TO RELATED APPLICATIONS

This application is a utility application claiming priority to co-pending U.S. Provisional Application Ser. No. 61/319,909 filed on Apr. 1, 2010 entitled "ITERATIVE CLUTTER CALIBRATION (ICC) WITH PHASED ARRAY ANTENNAS," the entirety of which is incorporated by reference herein.

GOVERNMENT RIGHTS IN THE INVENTION

This invention was made with government support under grant number FA8721-05-C-0002 awarded by the Air Force. The government has certain rights in this invention.

FIELD OF THE INVENTION

The invention relates generally to antenna systems. More specifically, the invention relates to reducing clutter in an antenna system or using clutter to lower antenna pattern sidelobes.

BACKGROUND

Antenna systems can employ a phased array of antenna elements to generate a steerable mainbeam with spatial sidelobes. Controlling the gain and phase of individual antenna elements shapes and steers the beam in a desired direction. Without good pattern measurements for each antenna element the beam forming may produce undesirably high sidelobes. Steerable beams are well suited for tracking moving ground or airborne targets from an airborne radar. SONAR for marine applications is another example where phased array systems are well suited for detecting moving targets. Phased array antennas can include a linear array or a two-dimensional array, be airborne, spaceborne or in the SONAR case under water.

Moving Target Indication (MTI) radars use phased array antennas and measure Doppler shift to detect target velocity. These are usually Pulse Doppler radars, which have advantages over continuous wave (CW) radars because the same antenna elements can switch between transmitting and receiving pulses. By modulating a high frequency carrier with a series of pulses and directing the pulses towards a target, the frequency of the pulses reflected by the target back to the antenna will be shifted, which indicates the relative velocity between the moving radar platform and the target. By dividing the time span between pulses into "range gates," the distance from the target to the antenna is also determinable.

Either due to lack of antenna calibration or electromagnetic field (EMF) interactions between the phased array antennas and the platform that transports the antennas (e.g. an aircraft for a radar, and a ship or submarine for a SONAR), antenna patterns are distorted and can raise sidelobes (i.e. create sidelobe "clutter") sufficiently to obscure target data. In other words, a radar beam pointing directly at a target aircraft may not yield a Doppler signal sufficiently discernable due to the elevated sidelobe clutter. It is not sufficient to model the EMF characteristics of an airframe because airframe tolerances are variable and are hard to capture accurately enough for modeling. In addition, Space Time Adaptive Processing (STAP) cannot be used to overcome the uncertainty in the individual antenna element patterns (whether due to a lack of calibration before mounting on the aircraft or due to airframe EMF distortion after mounting) in a radar with an analog beamformer, because in this case not all of the antenna elements are digitized; rather they are combined to form one or just a few beams prior to digitization and conversion into the range-Doppler frequency domain.

BRIEF SUMMARY

In one aspect, the invention features a method for calibrating a phased array antenna comprising combining a plurality of a receive signals generated by a plurality of antenna elements in a phased array antenna to generate a receive beam. A gain of each receive signal is determined according to a respective beamformer weight in a plurality of beamformer weights for the receive beam. A phase of each receive signal to the combination is determined according to a respective steering value in a plurality of steering values for the receive beam. The receive beam is processed to generate a main range-Doppler image. An average of a sidelobe clutter power is measured in the range-Doppler image for a plurality of ranges. A value of an objective function that is responsive to the average of the sidelobe clutter power is determined. The plurality of beamformer weights is modified. The step of determining the value of the objective function until a maximum value of the objective function is determined is repeated.

In another aspect, the invention features a computer program product for iterative clutter calibration. The computer program product comprises a computer readable storage medium having computer readable program code embodied therewith. The computer readable program code comprises computer readable program code configured to measure an average of a sidelobe clutter power in a range-Doppler image for a plurality of ranges. The computer readable program code is configured to determine a value of an objective function that is responsive to the average of the sidelobe clutter power. The computer readable program code is configured to modify a plurality of beamformer weights and is configured to repeat the step of determining the value of the objective function until a maximum value of the objective function is determined.

In another aspect, the invention features an apparatus for iterative clutter calibration comprising a storage module configured to store a plurality of beamformer weights for a beamformer. An image processor is configured to generate a main range-Doppler image from at least one receive beam supplied from the beamformer. A calibration processor is configured to determine a value of an objective function that is responsive to an average of a sidelobe clutter power and the beam former weights and is configured to replace the plurality of beam former weights in the storage module with a plurality of new beamformer weights that maximize the value of the objective function.

In another aspect, the invention features a method for iterative clutter calibration comprising measuring an average of a sidelobe clutter power in a range-Doppler image for a plurality of ranges. A value of an objective function that is responsive to an average of the sidelobe clutter power is determined. A plurality of beamformer weights is modified. The step of determining the value of the objective function until a maximum value of the objective function is determined is repeated. Each beamformer weight determines a gain and phase of a respective antenna element in an antenna system.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 8A is a modified view of FIG. 7A with suppressed sidelobes according to an embodiment of the invention.

FIG. 8B is a modified view of FIG. 7B with suppressed sidelobe clutter according to an embodiment of the invention.

FIG. 8C is a modified view of FIG. 7C with suppressed sidelobe clutter according to an embodiment of the invention.

DETAILED DESCRIPTION

Embodiments of antenna systems described herein provide for a significant reduction of sidelobe clutter through iterative clutter calibration. Embodiments advantageously use: controllability, without direct observability, of each antenna element or group of elements; observability of only one or a few beamformer outputs (significantly less than the number of antenna elements); and a strong return from ground clutter. ICC uses a dedicated calibration flight over a clutter environment producing strong omni-directional scattering. In contrast, a calibration flight over water would provide very weak clutter because the water does not produce strong backscatter.

Figure 1A:
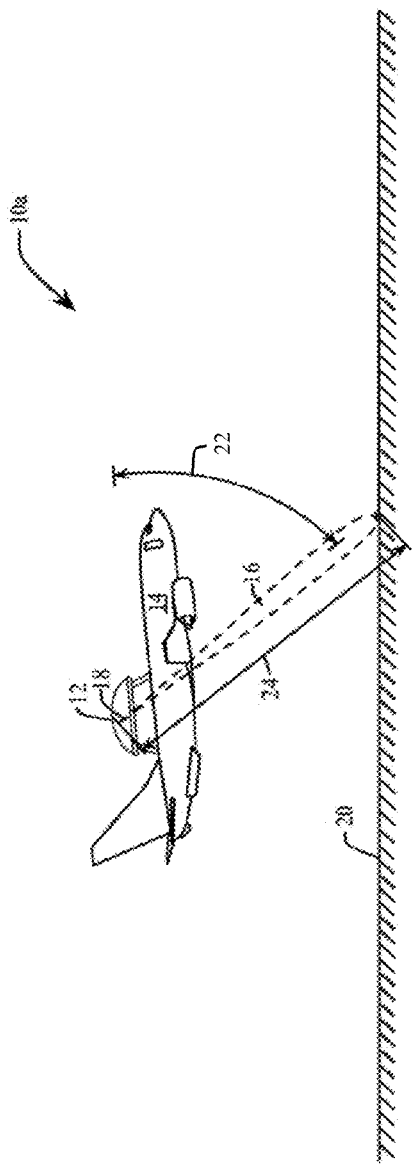
FIG. 1A is an elevation view of a moving radar platform emitting a beam.
Figure 1B:
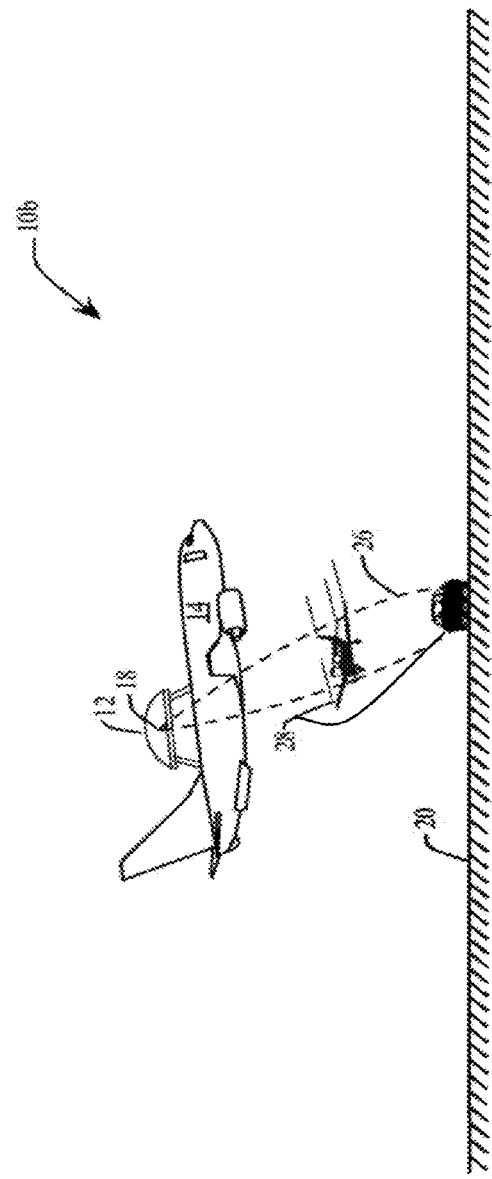
FIG. 1B is an elevation view of a moving radar platform detecting a target.

FIG. 1A illustrates a calibration flight with a radar 12 mounted on an aircraft 14. The radar 12 emits a beam 16 directed towards potential targets and this frequently also intersects the ground surface 20. The beam 16 is then scattered by the ground 20 with a portion of the scattered energy reflected towards and received by the radar 12 at the antennas 18. The beam has a depression angle 22 to direct the beam 16 in the direction of potential targets. This beam is frequently below the horizon and onto a reflecting or scattering ground surface. Preferentially, during this calibration flight the beam 16 is broadened when transmitting to excite more sidelobe clutter. The ground clutter range of the beam 16 is taken along the path from the antennas 18 to the reflecting surface 20. The beam 16 is emitted from the radar antenna elements 12 where weights applied to each antenna element control the azimuth and elevation of the beam on both transmit and receive. Different beamforming weights are frequently used on transmit and receive. Steering the beam in the elevation dimension changes the range 24 at which the center of the beam intersects the ground. As the aircraft 14 travels, this beam and its sidelobes intersect different locations on the ground 20. FIG. 1B illustrates usage of the radar after calibration to achieve low spatial sidelobes. The beam 26 strikes a moving target 28 (ground or air), and measures the target velocity through the Doppler frequency shift, range from the round trip propagation time, and angle from the beam shape.

Figure 2:
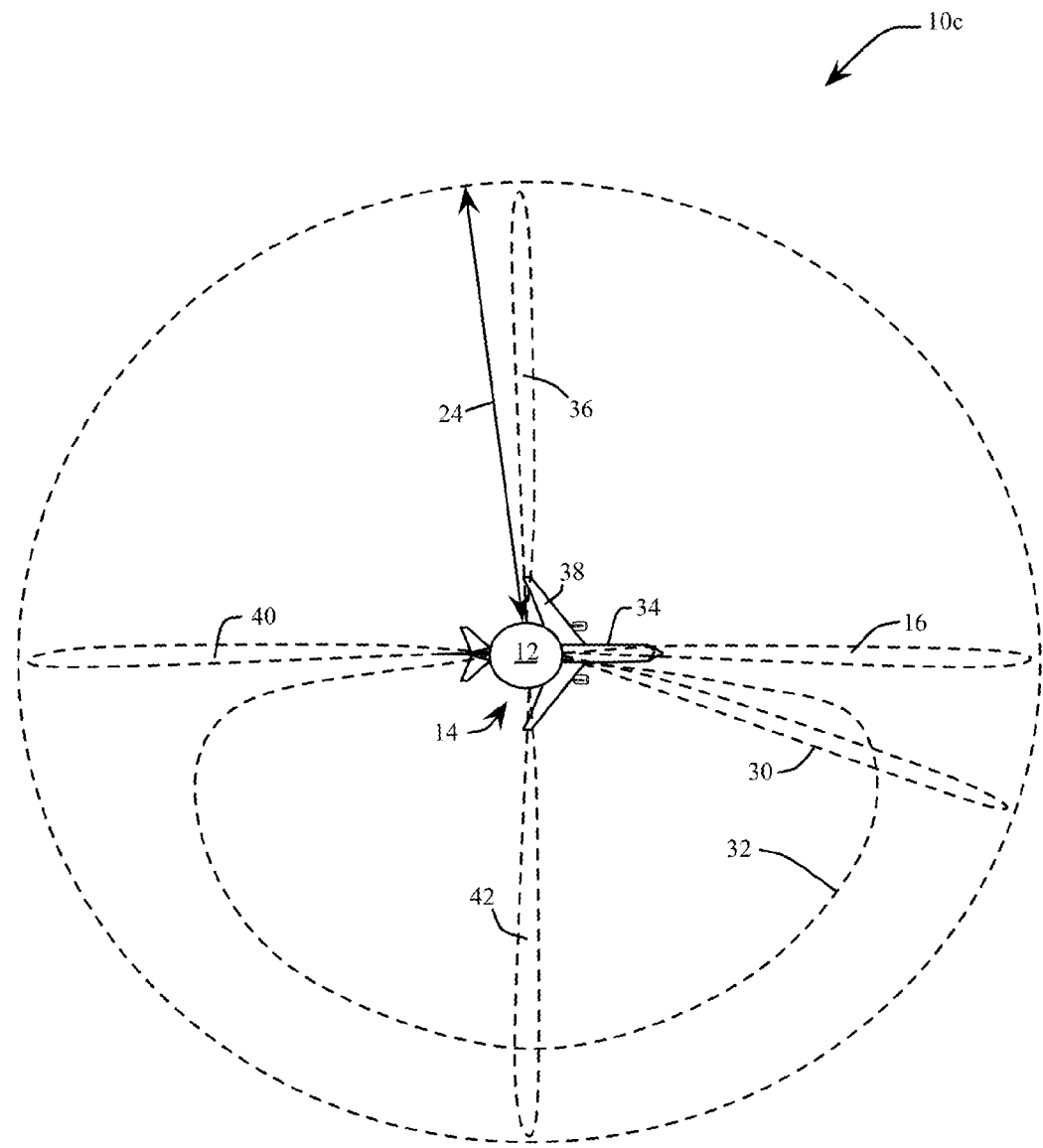
FIG. 2 is a plan view of a moving radar platform illustrating different beam characteristics.

FIG. 2 is illustrates different beam characteristics. In one embodiment, a radar is mounted on top of an aircraft. A forward facing array emits a beam 16 for "head-on" targets, which can include objects moving on the ground or in flight. A rear-facing antenna emits a beam 40 for "tail-chase" targets. Antenna arrays are also located on the left and right sides of the aircraft 14 to emit beams 36 and 42 respectively. In another embodiment, one or more of these antenna faces may not be present and the antenna could be on the side of the aircraft or in the nose. Each of the beams 16, 40, 36 and 42 are electronically-steerable to provide complete 360 degree azimuth coverage viewed from the top of the aircraft 14 by azimuth steering and at various elevations. Each of the beams emitted by the radar 12 sees a different level of distortion due to differing and varying degrees of airframe interaction. For example, direction 16 is distorted primarily by the fuselage 34 and nose of the aircraft 14, while direction 36 is distorted primarily by the wing 38 of the aircraft 14. FIG. 2 also illustrates a broadened beam 32 compared to a narrower beam 30. Beam broadening as shown in the particular beam 32 is advantageous for exciting clutter during the ICC calibration phase.

Figure 3:
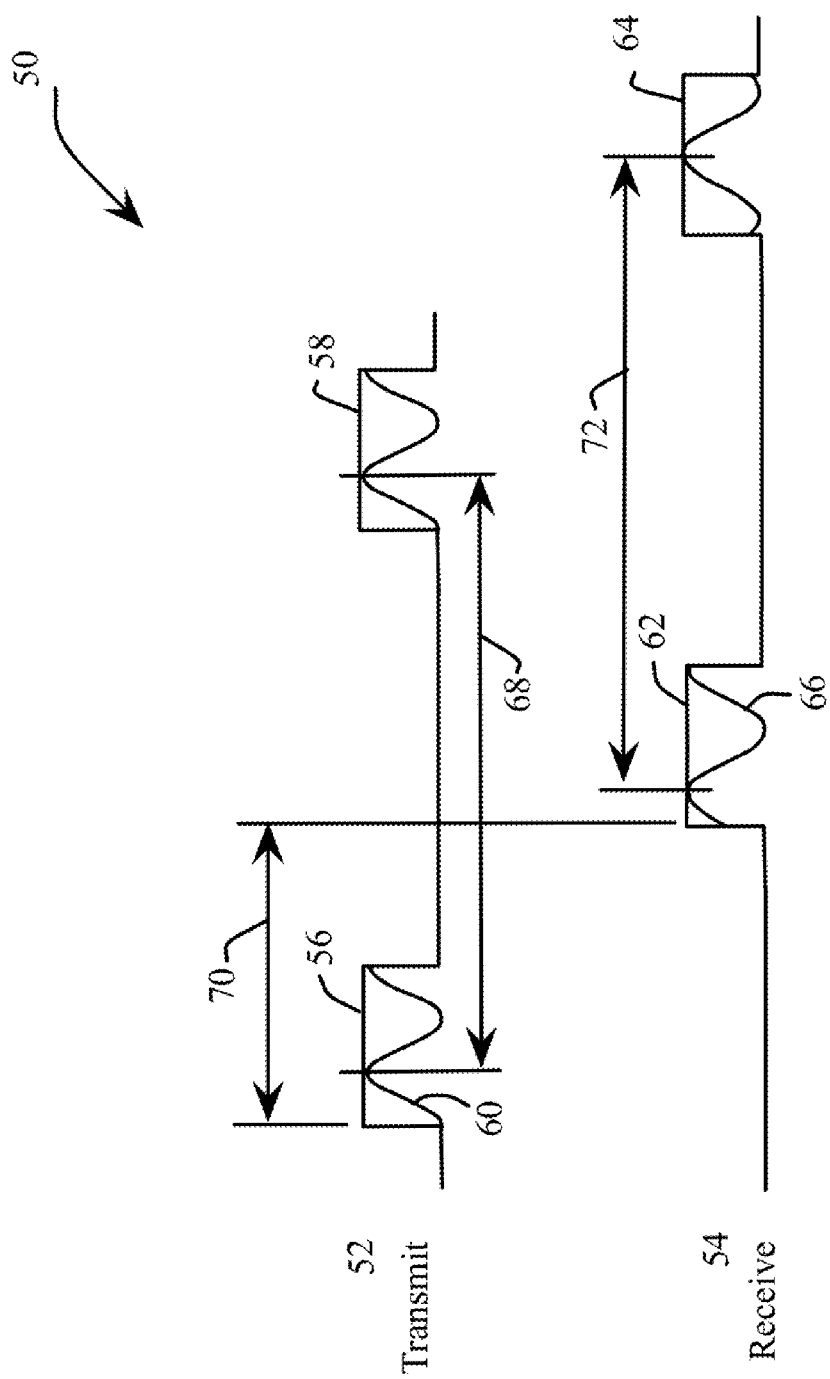
FIG. 3 is a schematic view illustrating a Doppler phase shift.

FIG. 3 describes how the radar 12 in FIG. 1B measures the range and Doppler frequency of an object, which is stationary 20 on the ground or moving 28. In one embodiment, the antenna elements 18 in the radar 12 transmit a signal 52 comprising a carrier wave 60 modulated by a series of pulses, two of which are 56 and 58. Each of the pulses 56 and 58 reflect off an object 28 or 20 and the pulses are received 62 and 64 by the radar. The time delay 70 between a transmit pulse 56 and a receive pulse 62 is a measure of the range to the object. The time between the peaks of the sine wave for successive pulses on transmit 68 is different on receive 72 depending upon the relative velocity between the object and the radar. This is a measure of the object's Doppler frequency shift and is measured pulse to pulse as a frequency phase shift modulo $2\pi$. The duration of the CPI is inversely proportional to the resolution of the Doppler frequency measurement. Variations on the pulse width, modulation of the pulse, carrier frequencies, and pulse spacing are often combined to achieve multiple goals.

The rate at which the pulses 56 and 58 are transmitted is determined by the Pulse Repetition Frequency (PRF). The PRF determines the radars unambiguous ability to measure target range because the interval between pulses 56 and 58 must be greater than the time required for a single pulse to be transmitted, reflected off an object and returned to the receiver. Multiple PRFs are used to resolve target range ambiguity. A series of pulses with the same PRF, beam direction, and carrier frequency 60 is called a Coherent Processing Interval (CPI). In a preferred embodiment, the ICC calibration phase employs many CPIs with the same parameters until low sidelobes are achieved for that beam. The procedure is repeated for the next beam look direction. In one embodiment, the ICC algorithm is initiated for the next beam as a phase shifted version of the previously converged beam. This is repeated for all beam directions and all carrier frequencies. Furthermore, it may have to be repeated for different flight geometries such as roll and pitch and different flexure of the wings due to fuel load. A look direction is a beam direction electronically steered with a particular azimuth and elevation. With reference to FIG. 2, beams 16, 30, 42, 40 and 36 each have a separate look direction. Further elaborating, a CPI is a series of pulses with the same PRF, carrier frequency 60, and look direction. In radars with an analog beamformer, typically a single set of beamformer weights are applied over the entire CPI. Since ICC requires iteration of numerous beamformer weights, it takes place over multiple CPIs, requiring a new CPI of data collection for every new evaluation of the objective function being maximized.

Figure 4:
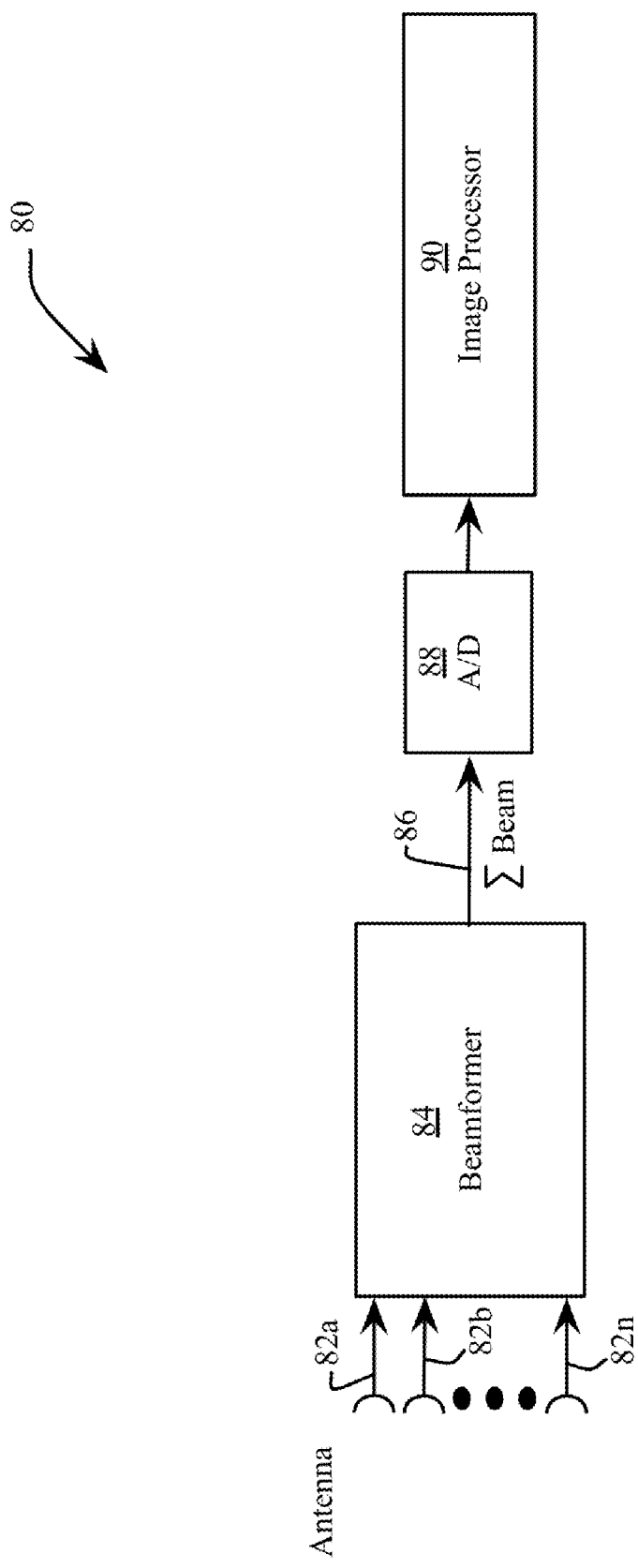
FIG. 4 is a schematic view of a range-Doppler system.

FIG. 4 illustrates a system for processing a Doppler image. A plurality of antenna elements 82a through 82n (generally 82) are controlled by a beamformer 84, which adjusts the gain and phase of each element to create a particular beam shape and direction. The weight value associated with each antenna element 82 is a gain (a positive number) and phase value (0 to $2\pi$ radians). In one embodiment, the beamformer 84 creates a composite beam 86 from the combination of antenna elements 82 suitably modified by the gain and phase selected for each antenna element. An analog to digital convertor (ADC or A/D) 88 converts the beam 86 to a digitized form for processing by the image processor 90. In one embodiment, the image processor 90 converts the digitized beam to a range-Doppler frequency domain image using a digital signal processor to execute a Fourier Transform.

Figure 5A:
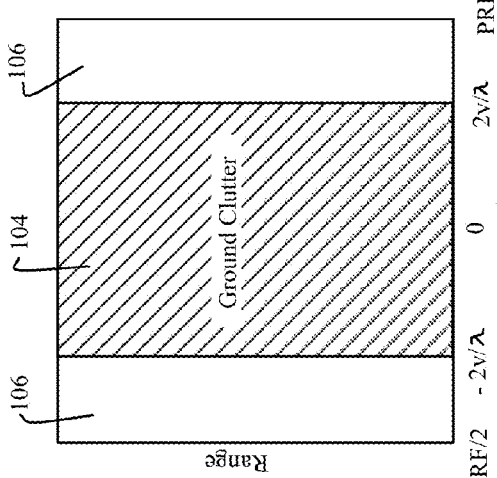
FIG. 5A is a graphical view of ground clutter in the time domain.
Figure 5B:
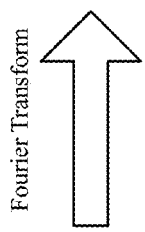
FIG. 5B is a graphical view of ground clutter in the range-Doppler frequency domain.
Figure 5B:
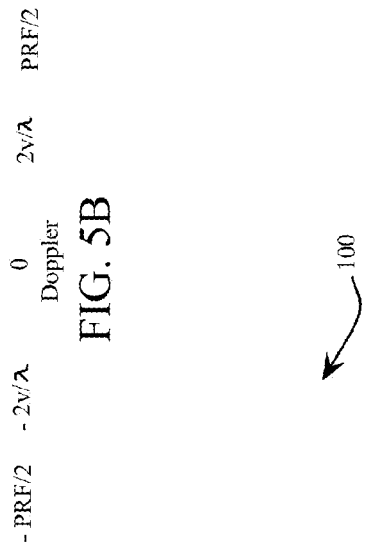
Figure 5C:
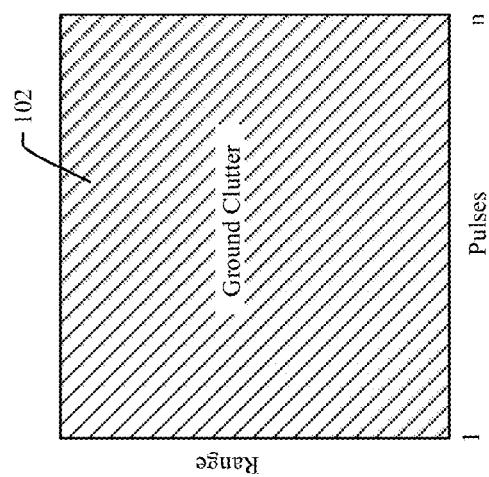
FIG. 5C is a graphical view illustrating the relationship of Doppler and beam angle.

FIG. 5A shows a graphical view of ground clutter 102 accumulated during a single CPI during a normal or ICC calibration flight with data collected from at least one CPI with multiple pulses and multiple ranges 24. The image is converted to the Doppler frequency domain by a Fourier transform for example, resulting in a graphical view of the Doppler frequency response accumulated over multiple ranges 24 as shown in FIG. 5B. In other embodiments other frequency transforms are used such as a Fast Cosine Transform for example. Doppler frequencies are measured unambiguously to $+/-PRF/2$ but ground clutter 104 extends over the Doppler frequency interval $+/-2v/\lambda$ where v is the speed of radar 12 and $\lambda$ is the wavelength of the transmit carrier frequency. The target Doppler is $2u/\lambda$ where u is the relative velocity between the radar and the target. If the target Doppler is within the interval $+/-2v/\lambda$ it competes with ground clutter and if outside it is in the clutter free region. Only targets with Dopplers within the interval $+/-2v/\lambda$ compete with ground clutter. If the $PRF/2<2v/\lambda$, the clutter is wrapped in Doppler. The ICC approach to calibration is applicable to any of the conditions above concerning the radar and target velocity and PRF. The unique relationship between Doppler rate and azimuth angle is shown in FIG. 5C for the side face of the antenna. The angle Doppler relationship is different for the front and back faces of the antenna and ICC is still applicable for these conditions. Frequently the elevation beamwidth is large enough such that after steering in elevation it illuminates targets at all elevations of interest. When the elevation beamwidth is narrow, then some elevation scanning is needed. Again ICC is applicable to either narrow or wide elevation beamwidths. Accordingly ground clutter 110 is a function of both Doppler and angle and this relationship can change with range. During a normal or ICC calibration flight, the ground clutter from angles between broadside and the tail will experience a negative Doppler because the radar is traveling away from the ground. From broadside to the nose a positive Doppler is experienced for ground clutter.

Figure 6C:
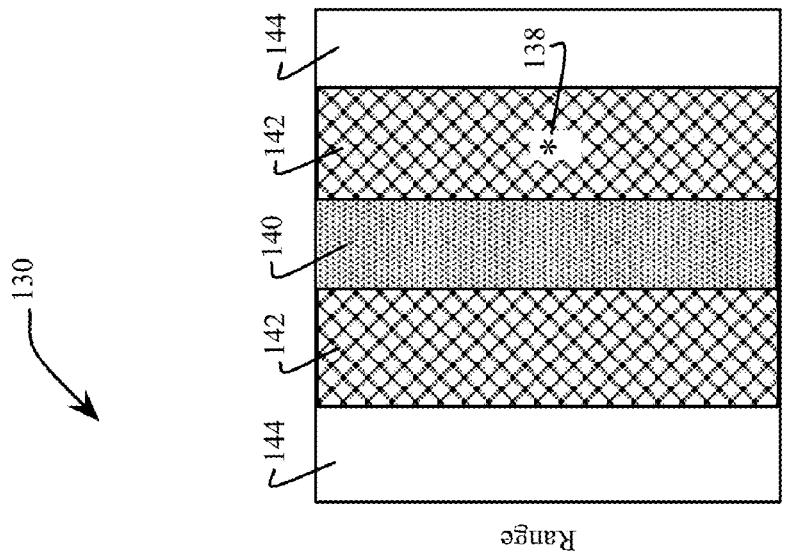
FIG. 6C is a graphical view of ground clutter in the frequency domain distinguishing mainbeam and sidelobe clutter.
Figure 6B:
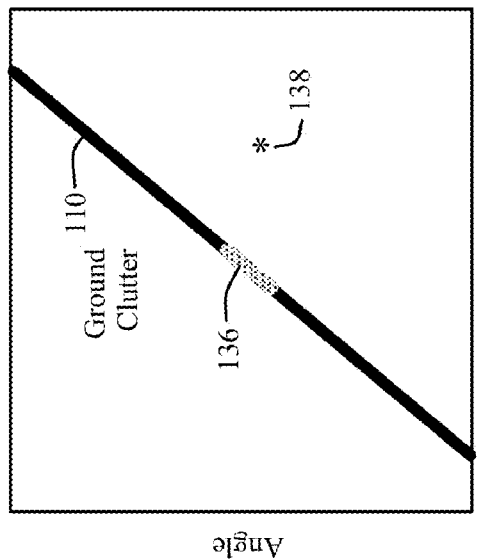
FIG. 6B is a graphical view illustrating the relationship of Doppler and beam angle with a moving target illuminated by a mainbeam.
Figure 6A:
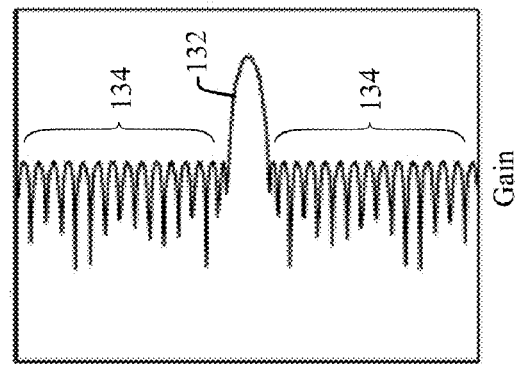
FIG. 6A is graphical view of a beam with sidelobes.

FIG. 6A shows the antenna pattern of a beam with a mainbeam 132 and sidelobes 134. The mainbeam 132 has a higher gain than the sidelobes 134, the latter when high are typically considered an undesirable artifact of beam formation. In FIG. 6B the mainbeam 132 is steered in the direction of a moving target 138. For example, during continuous beam scanning, the radar 12 in FIG. 2 will at a certain time direct a beam 36, at the moving target. Since the target is moving, it does not fall on the ground clutter line and if moving fast enough is at the same Doppler as the sidelobe clutter 110 and not the mainbeam clutter 136 and this property is exploited to achieve detection. FIG. 6C shows a range Doppler image for this beam with the target outside of the clutter due to the mainlobe 140 but within the sidelobe clutter 142. Due to high sidelobes in the antenna pattern 134, the target 138 may be obscured by the sidelobe clutter 142. The goal of ICC is to have the sidelobe clutter 142 be below the thermal noise and thus the combination of sidelobe ground clutter and thermal noise 142 is comparable to just the thermal noise in the clutter free region 144. ICC accomplishes this by generating an antenna pattern in FIG. 6A with low sidelobes 134 thereby lowering the sidelobe clutter 142 competing with the target 138. In some embodiments it may not be necessary or possible for the sidelobe ground clutter to be below the thermal noise.

Figure 7:
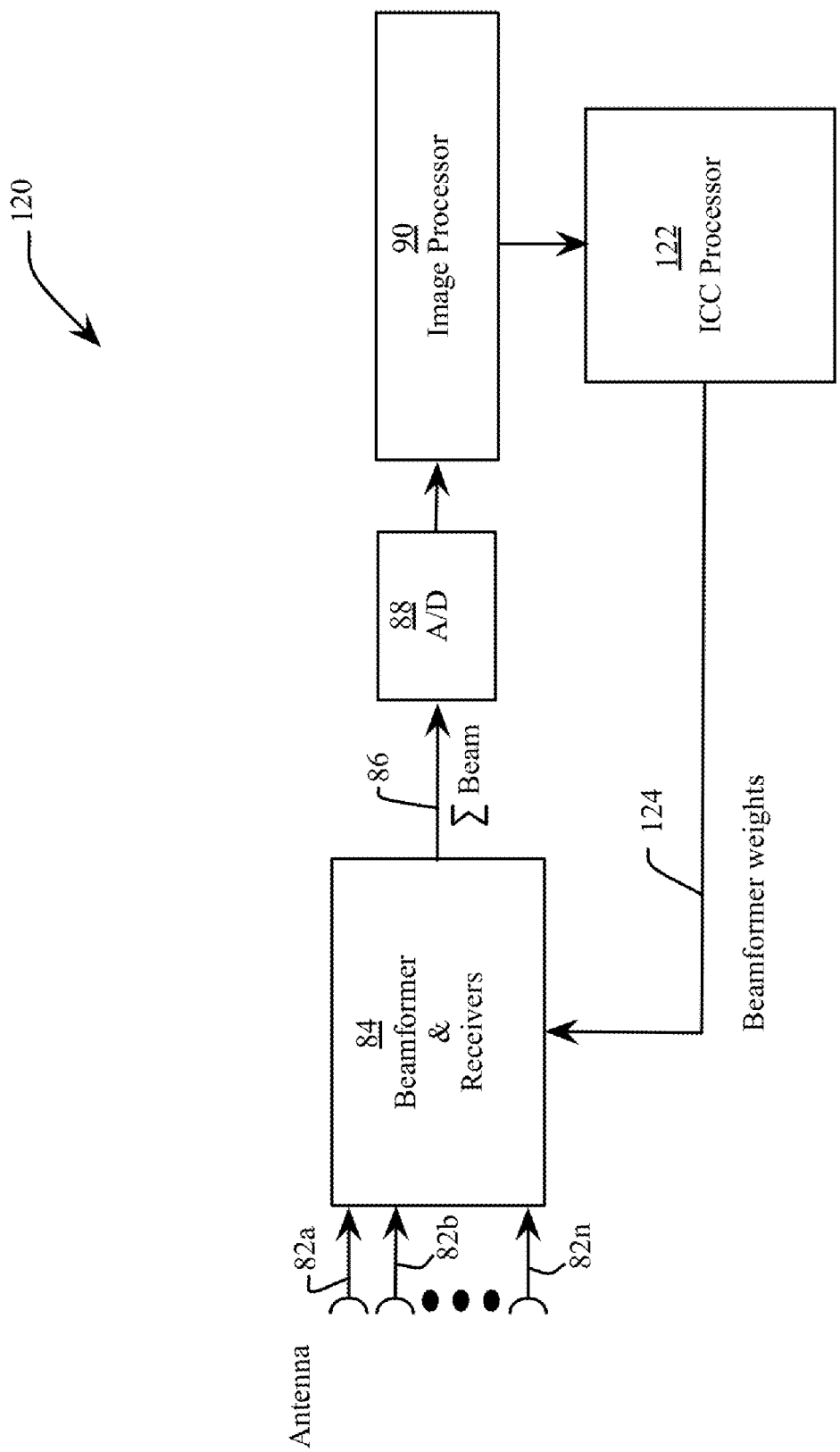
FIG. 7 is a schematic view of a range-Doppler system with iterative clutter calibration (ICC) according to an embodiment of the invention.

FIG. 7 is a modified range-Doppler system according to one of the preferred embodiments. An ICC processor 122 analyzes the range-Doppler image produced by the image processor 90 and iteratively, each CPI, adjusts the beamformer weights 124 provided to the beamformer 84 and recalculates the range-Doppler image until an objective function is maximized. The objective function seeks to maximize the Signal-to-Interference-Plus-Noise-Ratio (SINR) by minimizing the sidelobe clutter 142 without unduly degrading the mainbeam gain 132 as shown in FIG. 6A.

FIGS. 8A, 8B and 8C show the graphical views of FIGS. 6A, 6B and 6C after ICC has been performed. FIG. 8A shows sidelobes 154 that have been reduced by an amount 156 over the uncalibrated sidelobes 134 of FIG. 6A. There is no benefit for lowering the sidelobes 154 further than is necessary to achieve sidelobe clutter 166 below the thermal noise. For some embodiments the sidelobes 154 do not need to be that low and it may not be possible due to the nature of the antenna element distortion or hardware limitations. Reduction of the sidelobes 154 results in a small taper loss 158, or reduction of gain in the mainbeam 152, and a slight broadening 160 of the mainbeam 152 which reduces the sensitivity of the radar and the spatial selectivity of the beam. ICC does not allow the taper loss to get too large while maximizing the SINR. Similar to FIG. 6B, the moving target 138 produces a positive Doppler under the same conditions as described for FIG. 6B. In contrast to the range-Doppler map shown in FIG. 6C, the reduction in sidelobe clutter 166 shown in FIG. 8C now allows the moving target 138 to be detected.

The ICC processor 122 optimizes the beamformer weights by maximizing an objective function in an iterative fashion and by using the one-to-one correspondence between Doppler and clutter azimuth angle shown in FIG. 8B. The objective function seeks to minimize sidelobe clutter 154 while maintaining good mainbeam 152 gain in the direction of the target 138 by determining a maximum of the objection function. The sidelobe clutter 166 is isolated from the mainbeam clutter 164 by defining a mainbeam guard region spanning the width of 164. An example of an effective objective function according to one of the embodiments is:

$$f = \log_{10}[(|w^H v|^2)/(\text{average sidelobe clutter power})]$$

"w" is a unit normed vector of complex beamformer weight values for each antenna element for the current ICC iteration performed over at least one CPI., "H" denotes the Hermitian Transpose operation, "v" is the unit normed steering vector for each antenna element, and $w^H v$ is the inner product of w and v. The term $|w^H v|^2$ is a measure of the taper loss 158 in gain from beamforming with the beamformer weight w. It is important that the objective function is conditioned by taking its logarithmic value. This turns multiplicative errors into additive errors, which results in significantly faster convergence when the objective function is evaluated with a stochastic optimization method. In another embodiment, the objective function is conditioned by an inverse hyperbolic sign function instead.

In another embodiment, a soft constraint term is added to the objective function $f$ to partially restrain, or encourage, the objective function to meet several goals. In one example, in addition to the goal of minimizing sidelobe clutter while maintaining good beam gain, the soft constraint term ensures a mainbeam 152 target gain is also achieved. In another embodiment, multiple soft constraint terms are added to encourage particular beam pattern shapes or other desirable attributes. In one of the preferred embodiments the soft constraint term used to maintain the mainbeam 152 target gain is $h(\log_{10}|w^H v|^2)$, where "h" is a piecewise linear function. Accordingly, the objective function with this soft constraint term is:

$$f = \log_{10}[(|w^H v|^2)/(\text{average sidelobe clutter power})] + h(\log_{10}|w^H v|^2)$$

The objective function is evaluated during a dedicated calibration flight prior to the radar's intended use. Beamformer weights are changed once every CPI. Optimizing the objective function results in optimizing the Signal-to-Interference-plus-Noise-Ratio (SINR) defined earlier, or restated minimizes sidelobe clutter while maintaining an acceptable mainbeam. The method of objective function evaluation is constrained by several criteria. The evaluation must be tolerant of changes in the clutter as the aircraft moves, as well as occasional interference, for example from Electro-Magnetic Interference (EMI) or spurious hardware operation. In the example of a SONAR based approach, the antenna array moves on a submarine or a submerged array of towed antenna elements. It is also necessary for the algorithm to converge within a reasonable number of function evaluations (e.g. several thousand) because each evaluation of the objective function requires an entire CPI of dedicated flight time. In addition, the entire radar platform needs to be calibrated in a reasonable aircraft flight time, a few hours for example. Within the tight time constraints for ICC convergence, potentially hundreds of complex-valued weights, each weight associated with an antenna element, are tuned with extreme accuracy. Every look direction and operating frequency uses different weights.

Figure 9:
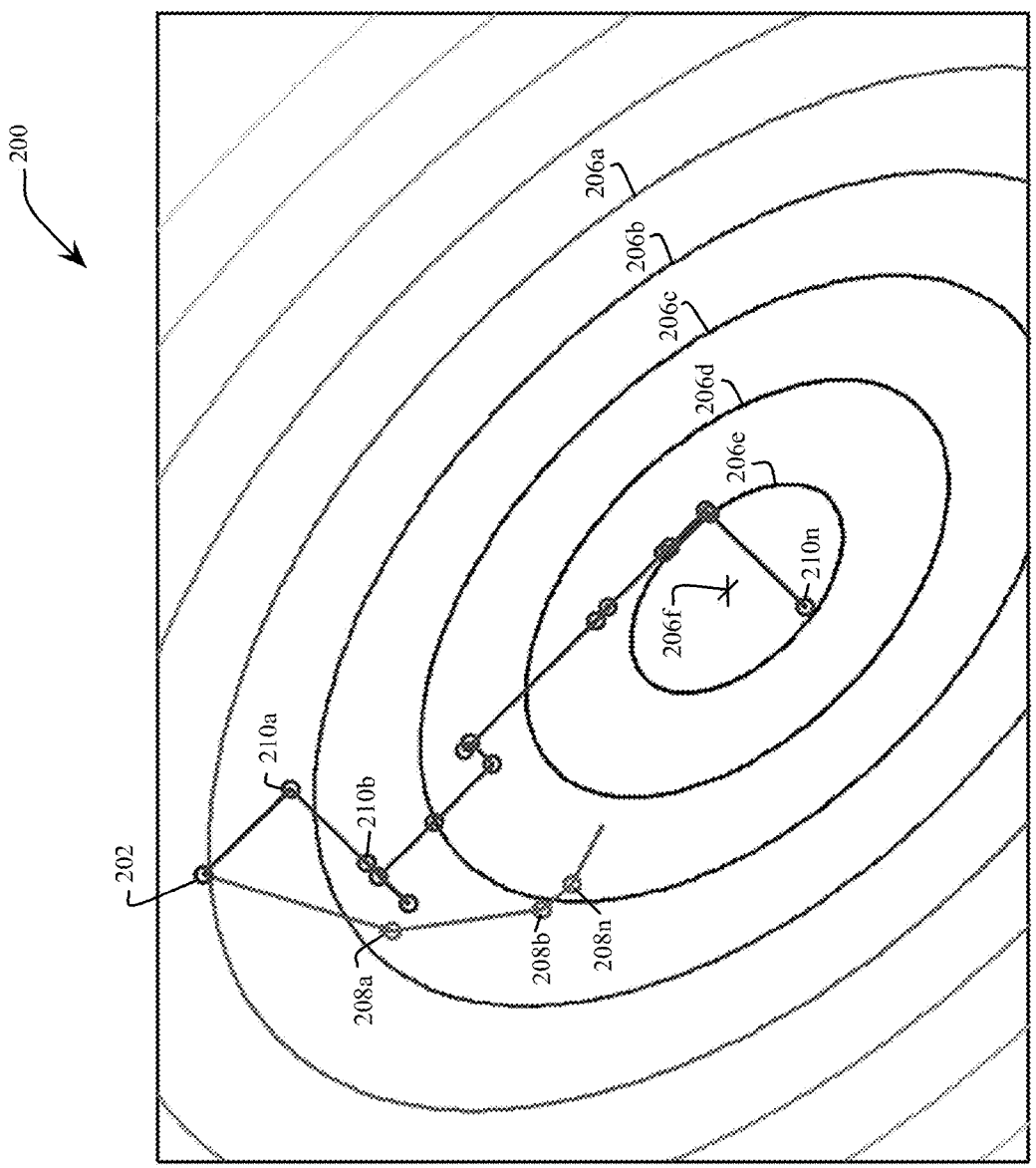
FIG. 9 is graphical view of an objective function optimization comparing traditional and stochastic optimization methods.

Standard numerical optimization techniques are ill-suited to this task due in part to the stochastic fluctuation of clutter returns from CPI to CPI, caused by the clutter scene changing as the location of the aircraft moves during flight. Such fluctuations can dramatically increase convergence time for standard optimization algorithms. FIG. 9 shows the optimization of a stochastically varying objective function using a traditional non-stochastic approach compared to a stochastic approach. The curves 206a-e represent sample contours of the objective function, along which the objective function stays constant. In both cases the same number of CPIs is assumed. The maximum of the objective function lies within the small region bounded by the contour 206e, at 206f. Beginning at step 202, each of the two optimization approaches seeks to move in the direction of the function gradient at the current point, which is perpendicular to the contour at the current point. Moving in this direction always increases the objective function and makes progress towards the maximum. The traditional approach attempts to mitigate stochastic fluctuations by measuring the objective function several times and averaging the results, every time it requires a function evaluation, beginning at step 202 and progressing to 208a, 208b and 208n for each iteration. One of the preferred embodiments uses a Simultaneous Perturbation Stochastic Approximation (SPSA) method, shown in FIG. 9 progressing from step 202 to 210a, 210b and ultimately to 210n.

The SPSA method is better suited to the ICC for at least two reasons. First, the SPSA method is more tolerant of noisy measurements inherent in the variation in sidelobe clutter during a calibration flight and at various beam azimuth angles distorted by different portions of the aircraft. Second, the SPSA method converges much quicker than alternate methods because only two evaluations of the objective function are required for each step regardless of the number of variables "N" being optimized over. For example, the 16 steps between 202 and 210n only require 32 objective function evaluations. In contrast, the traditional method implemented for FIG. 9 requires on the order of 4N (N=2 in the FIG. 9 example) objective function evaluations (CPIs) for each step. After the same number of objective function evaluations, the traditional method has only optimized to a point between the 206c and 206d contours, whereas the SPSA method has optimized past the 206e contour. While each of the SPSA evaluations are individually less accurate than the traditional method, the SPSA method converges to an acceptable maximum value of the objective function faster (a fewer number of CPIs) on average.

As the SPSA algorithm is designed to optimize functions dependent on real variables, and our beamforming weights are complex variables, it is necessary to convert each complex variable (i.e., gain and phase) into two real variables representing its real and imaginary part before invoking the main SPSA optimization routine. As the standard SPSA algorithm is designed to find a function minimum, and we seek to maximize our objective function, it is convenient to call on the standard SPSA algorithm to minimize the negative of our objective function, which is mathematically equivalent to maximizing our original objective function.

In one embodiment, the objective function is evaluated with a modified SPSA method by altering the setting for "c" parameter (SPSA-c) to be greater than or equal to a standard deviation of the objective function. SPSA-c determines the scale of finite differences used in gradient approximations and is optimized to enhance stability and provide for faster convergence of the type of objective functions used in ICC. In one embodiment, SPSA-c is set to 10 times the standard deviation of the objective function, while in another embodiment SPSA-c is set to equal the standard deviation of the objective function. In one embodiment, the standard deviation of the objective function is evaluated over 20 CPIs. In another embodiment, 100 CPIs are used for improved accuracy.

In one embodiment, the objective function is evaluated with a modified SPSA method by adaptively modifying the "a" parameter (SPSA-a). SPSA-a determines the scale of gradient ascent across iterations of the SPSA method. First, SPSA-a is chosen to be equal to, or greater than a large gradient scale number (e.g. 100) such that the resulting first step along the gradient keeps the resulting weights' taper loss at or about equal to a desired taper loss constraint. If the resulting step taken does not improve the objective function compared to the original set of beamformer weights (e.g. less than 10% improvement), SPSA-a is reduced by a multiplicative factor (e.g. 75%), the original set of beamformer weights are reused and the step along the gradient is repeated. When SPSA-a has been reduced to a value such that the first gradient step improves the objective function, then that value of SPSA-a is fixed and used for the remainder of the SPSA method unless insufficient progress is achieved as discussed below. In one of the preferred embodiments both the SPSA-c and SPSA-a parameters are modified.

For ICC stability it is necessary to verify that a new set of beamformer weights proposed by an iteration of SPSA does not substantially decrease the objective function value too much. Performing this verification requires an additional CPI hence this step is only performed periodically with the frequency of the verification steps adapted based on recent objective function observations. In one embodiment based on an air-surveillance radar, a decrease in objective function by 15 dB in a single SPSA iteration is considered substantial. It is important that the limit beyond which objective function decrease is considered "substantial" not be set too stringently because the stochastic nature of the SPSA method necessitates some fluctuations of objective function values. If a new set of beamformer weights causes the objective function to decrease below the substantial threshold, the new set of beamformer weights are discarded and the previous set of beamformer weights is reused. The level beyond which an iteration is considered substantial and the adaptive nature of the verification steps vary between systems. For example, the mounting location of the antenna elements, whether the antenna array is one-dimensional or two-dimensional and whether the antenna operates as a RADAR or SONAR can affect the optimal settings.

In one embodiment, the ICC stability check described in the previous paragraph is performed every iteration for the first 100 iterations, after which it is performed once every 100 iterations. The purpose of the checks after the first 100 iterations is primarily to verify that the SPSA method is converging on a satisfactory solution rather than to check for large fluctuations. In another embodiment, the decrease in the objective function value is checked every iteration for 50 iterations. If after 50 iterations there has not been a "substantial" decrease in the objective function then the ICC stability checks are performed after every 5 iterations for 50 iterations, otherwise repeat the check every iteration for 50 iterations. If after checking every 5 iterations there has not been a "substantial" decrease in the objective function then the ICC stability checks are performed every 25 iterations for 50 iterations, otherwise repeat the check every 5 iterations for 50 iterations. Numerous variations to the ICC stability method described above are envisioned within the scope and spirit of suppressing spurious computational events without incurring excessive verification overhead.

Figure 10:
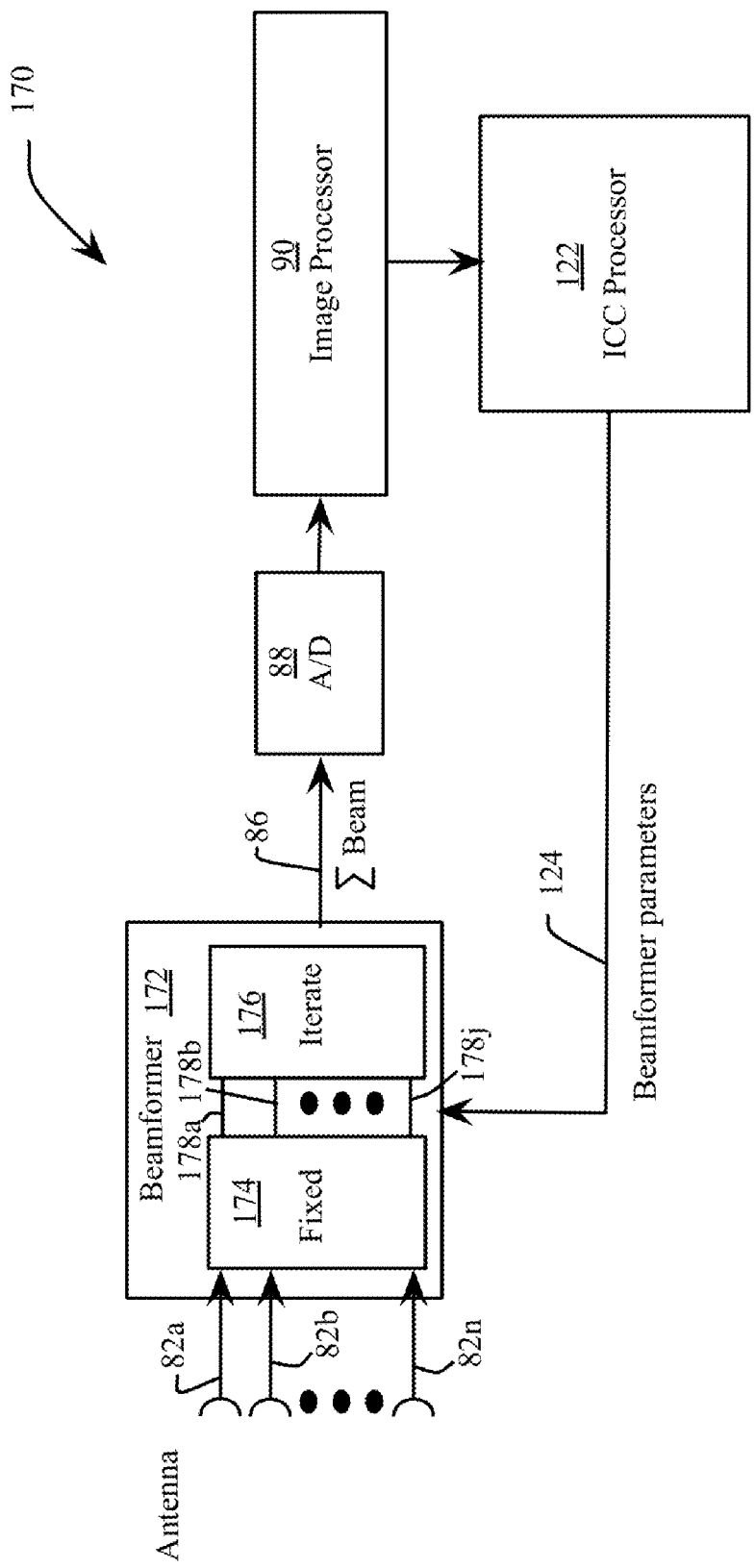
FIG. 10 is a schematic view of a range-Doppler system with ICC and beamspace parameterization according to an embodiment of the invention.

FIG. 10 shows one of the preferred embodiments with reduced-dimension beamspace parameterization of the beamformer weights. This embodiment is preferentially used when there are a large number of antenna elements or when the eigenvalue spread of the clutter covariance matrix used by the SPSA method is large enough to negatively impact the convergence time. Although beamspace parameterization generally improves convergence time for any number of antenna elements, an acceptable convergence time may be attained for smaller arrays (e.g. a few dozen elements or less) without the additional complexity of a beamspace parameterization. For substantially larger arrays (e.g. hundreds of elements), an effective beamspace parameterization becomes much more important. FIG. 10 modifies the system shown in FIG. 7 by dividing the function in the beamformer 172 into a fixed beamformer 174 with multiple outputs 178a, 178b, and 178j, which are less than the number of antenna elements. ICC iteratively adjusts the coefficients for linearly combining these 178a, 178b, and 178j into a single ΣBeam output 86. By reducing the number of variables to iterate, ICC converges faster. The functions in the fixed 174 and iterate 176 boxes are actually never formed but are computed in the ICC processor 122 to compute a single weight vector 124 which combines all of the antenna elements 82a, 82b, and 82n to produces the single ΣBeam output 86.

An example of a beamspace is a set of nominally-formed beams pointing (or steered) in a region of interest and around areas with high sidelobes. These nominally-formed beams can be tapered with a suitable taper function (also referred to as windowing) by choosing a fixed transformation function 174 that implements the taper. A variety of tapers are suitable for ICC including Kaiser, Chebychev, Hamming, Blackman-Harris, Tukey, and Hann. The taper is chosen to produce the desired sidelobe performance on a comparable array where all antenna element patterns are identical in a similar clutter environment. Beamspace parameterization is suitably chosen for the particular application of the antenna system, however all configurations reduce the number of parameters over which the objective function is optimized. A properly chosen beamspace generally allows larger step sizes for each iteration and accordingly faster convergence to the objective function maximum.

In one embodiment, the beamspace is comprised of two sets of beams. The first set of beams are spaced closely (e.g.

less than or equal to one beamwidth) in azimuth and elevation and are selected so that all beams lie within the mainbeam guard region of the beam being fitted, the same guard region used to exclude mainbeam clutter from the objective function. The second set of beams is added outside the mainbeam region and is positioned near areas of strong sidelobe clutter. The second set of beams is scaled in the following way. Define SCP(w) as the amount of sidelobe clutter power measured with the beamformer weights w (where the sidelobe region is fixed relative to the beam being fit by ICC). The magnitude of each of the beams in the second set of beams must be scaled so that SCP(w) is approximately the same for each of these beams. SCP(w) is measured for each beam in the second set of beams before iterating in the ICC process by applying the beamformer weights w for a single CPI, and this does not substantially affect overall convergence time.

In another embodiment, the initial beamspace is comprised of two sets of beams. The first set of beams are spaced closely (e.g. less than or equal to one beamwidth) in azimuth and elevation and are selected so that all beams lie within the mainbeam guard region of the beam being fitted, the same guard region used to exclude mainbeam clutter from the objective function. The second set of beams is added outside the mainbeam region and are positioned near areas of strong sidelobe clutter. The entire set of beams is then modified in the following way. Define the N×J matrix W to be the matrix of beamforming coefficients for the beamspace, where N is the number of antenna elements and J is the number of beams in the beamspace. A parameter $\alpha$ is chosen which lies between 0 and 1 whose optimal choice is dependent on the magnitude of the antenna errors and other specifics of the radar. A new matrix W' is formed by singular decomposition of W, such that the singular directions of W and W' are the same, but each of the singular values of W' are equal to the corresponding value for W plus the quantity $\alpha$. The columns of the resulting W' matrix are the beamforming coefficients for the modified beamspace. In one embodiment, the value of $\alpha$ is chosen so that $\alpha^2$ is approximately the ratio of average clutter power to peak mainbeam clutter power observed by the radar when using a nominal beamformer, which in the absence of the antenna errors, would be expected to provide excellent clutter suppression. In another embodiment, the choice of beamspace requires a basic model of the sidelobe clutter covariance matrix to be computed through simulation software, (with the mainbeam guard region excluded) to compute a basis of eigenvectors. Choose the "K" eigenvectors with the "K" smallest eigenvalues, where the parameter "K" is chosen to be large enough that the quiescent beam incurs very little taper loss (e.g. −1 dB) when orthogonally projected into the space spanned by the K eigenvectors. The "K" eigenvectors, scaled by the square root of their respective eigenvalues are then used as a reduced dimension beamspace for ICC. If ICC does not converge to a sufficiently good SINR in this beamspace, K may be increased and ICC repeated. In general, using a larger K value will provide better sidelobes at the expense of longer convergence time. In general, the better the covariance matrix model the better the resulting performance, but even a model lacking any antenna-airframe interactions may provide a beamspace exhibiting excellent performance for ICC.

In one of the preferred embodiments the objective function uses previously fitted beamformer weights from a nearby look direction as a starting point for the ICC. Each of the beamformer weights are scaled to perform a spatial shift between the look direction that the previous beamformer weights were optimized for and the current look direction being fitted. This spatial shift assumes an ideal antenna array environment with no antenna errors. The result is a reasonable starting point for the ICC, which in some applications has been observed to reduce convergence time by more than 50%.

Figure 11:
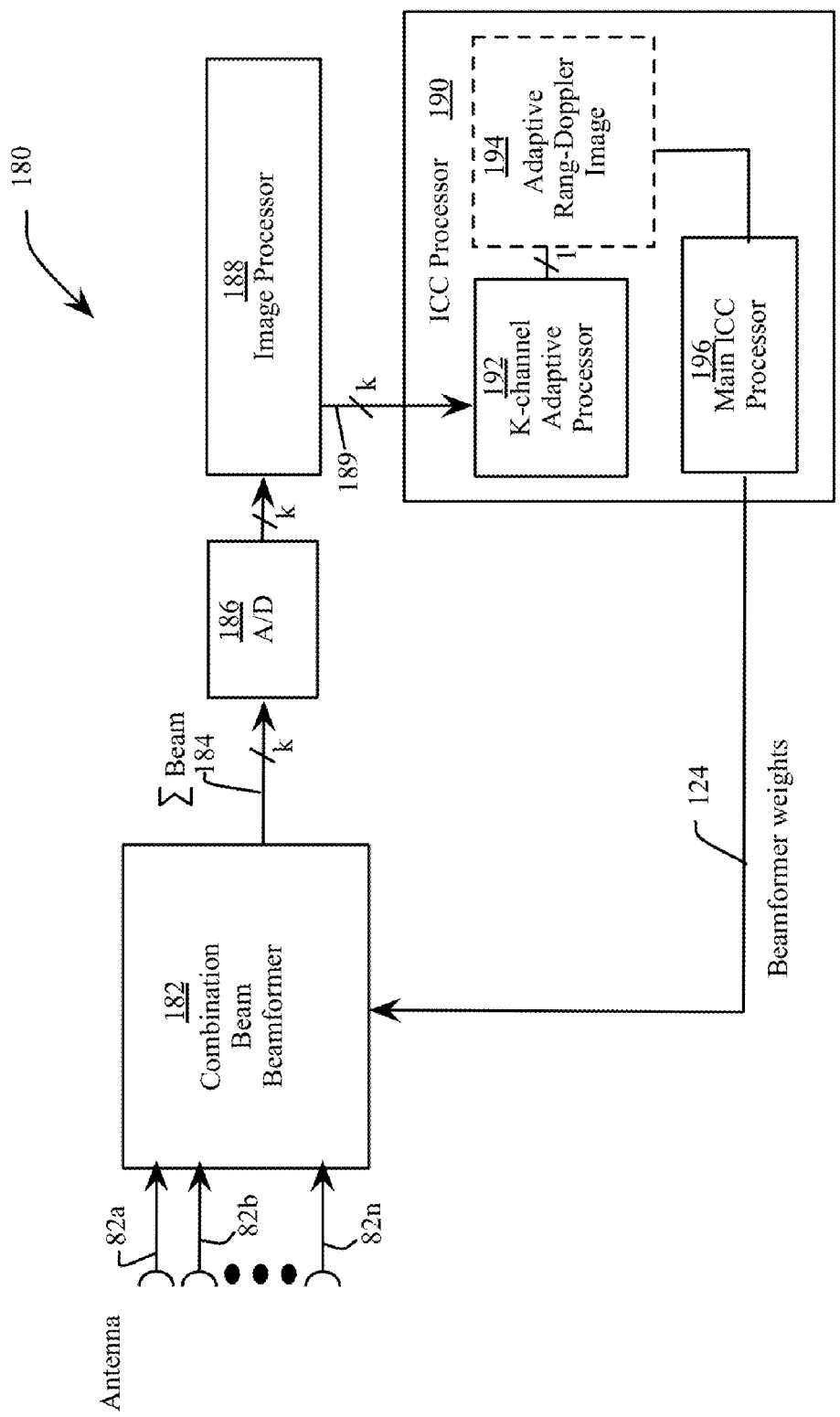
FIG. 11 is a schematic view of a range-Doppler system with ICC and multiple digitized beams according to an embodiment of the invention.

FIG. 11 shows another embodiment including the formation of multiple combination beams. The Combination Beam Beamformer 182 creates combination beams 184 from various linear combinations of the array of antenna elements 82. For example, a "sum-and-difference monopulse" embodiment divides the antennas 82 into four quadrants to provide a sum combination adding all four quadrants, a delta-azimuth combination comparing two vertically separated pairs of quadrants, a delta-elevation combination comparing two horizontally separated pairs of quadrants and a fourth combination. The sum-and-difference monopulse embodiment provides better target direction resolution over a single beam approach using only a sum beam. In other embodiments include two combination beams 184 and other embodiments have more than four combination beams 184.

The plurality of combination beams 184 are digitized by an A/D convertor 186 and processed into a plurality of images 189 by an Image Processor 188, with one image formed per beam. Each of the images are processed by an ICC Processor 190 to create a new set of beamformer weights 124, which then replace the weights used by the Combination Beam Beamformer 182. The ICC Processor 190 converts the plurality of images 189 to a single Range-Doppler image 194 by using an adaptive processor 192. The single Range-Doppler Image is then used by the Main ICC Processor 196 to maximize the value of the objective function as previously described for FIG. 7 to create the new set of beamformer weights 124. Each of the combination beams 184 use a slightly different set of weights but are related as linear combinations of the same signals received at the antennas 82. By computing the clutter covariance matrix from each of the beam images 189 and using covariance matrix inversion a new set of beamforming weights is generated for the new adaptive range-Doppler image 190 and subsequently used by the Main ICC Processor 196. This results in less objective function fluctuation because some of the sidelobe clutter is removed by the optimization.

Figure 12A:
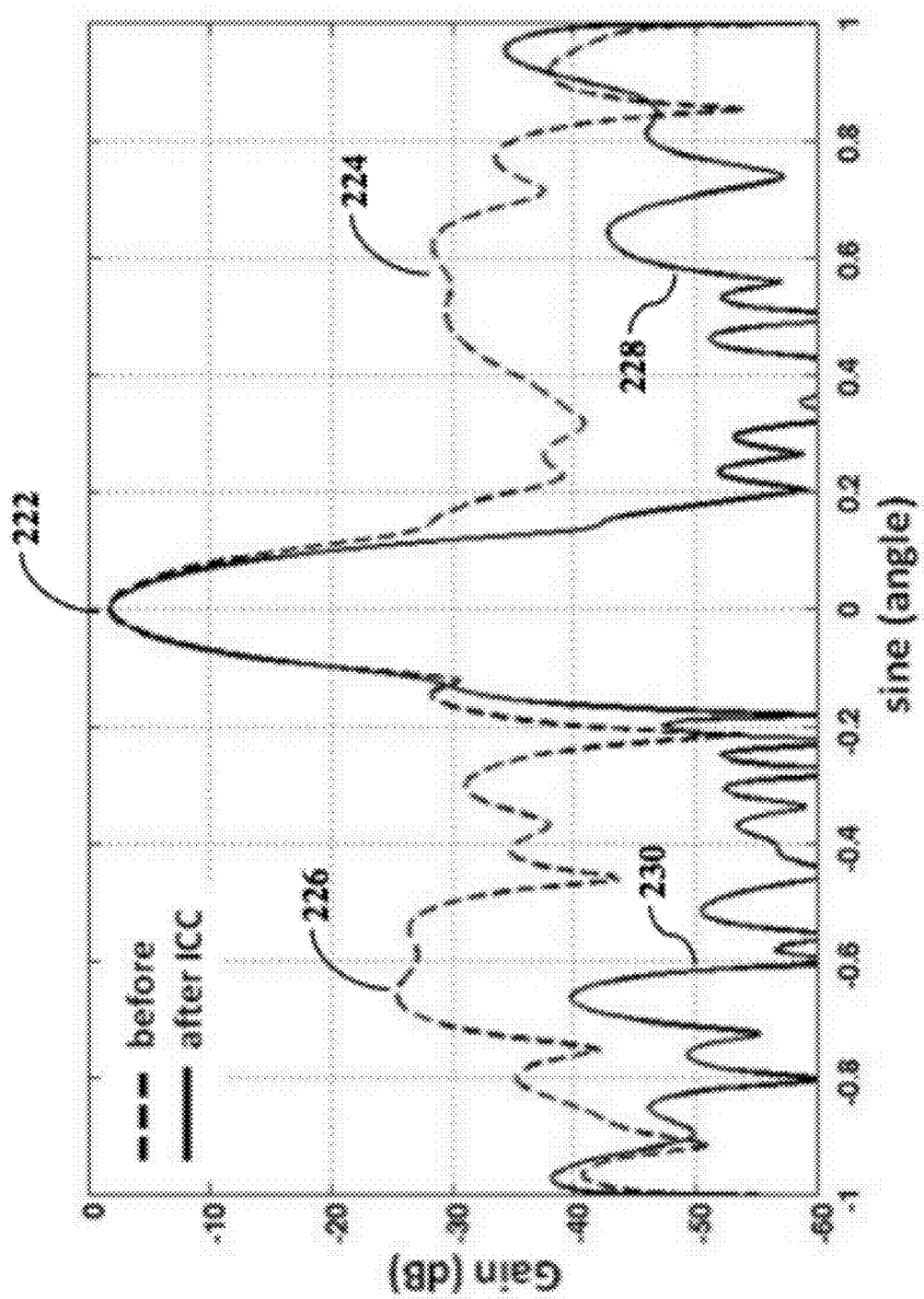
FIG. 12A is a graphical view of simulated antenna patterns (azimuth cut) before and after ICC for a linear array of 32 dipoles over a ground plane.
Figure 12B:
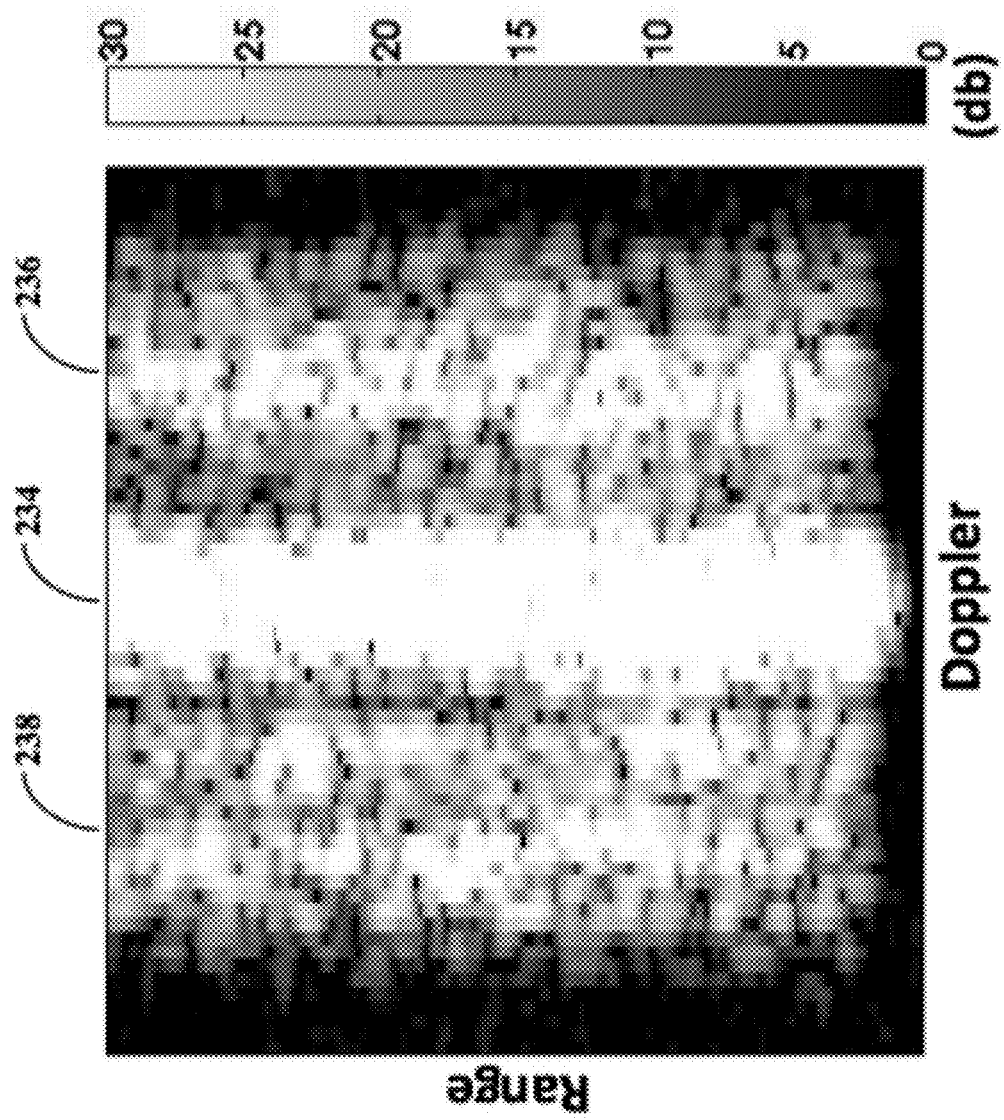
FIG. 12B is a graphical view of the range-Doppler image before ICC.
Figure 12C:
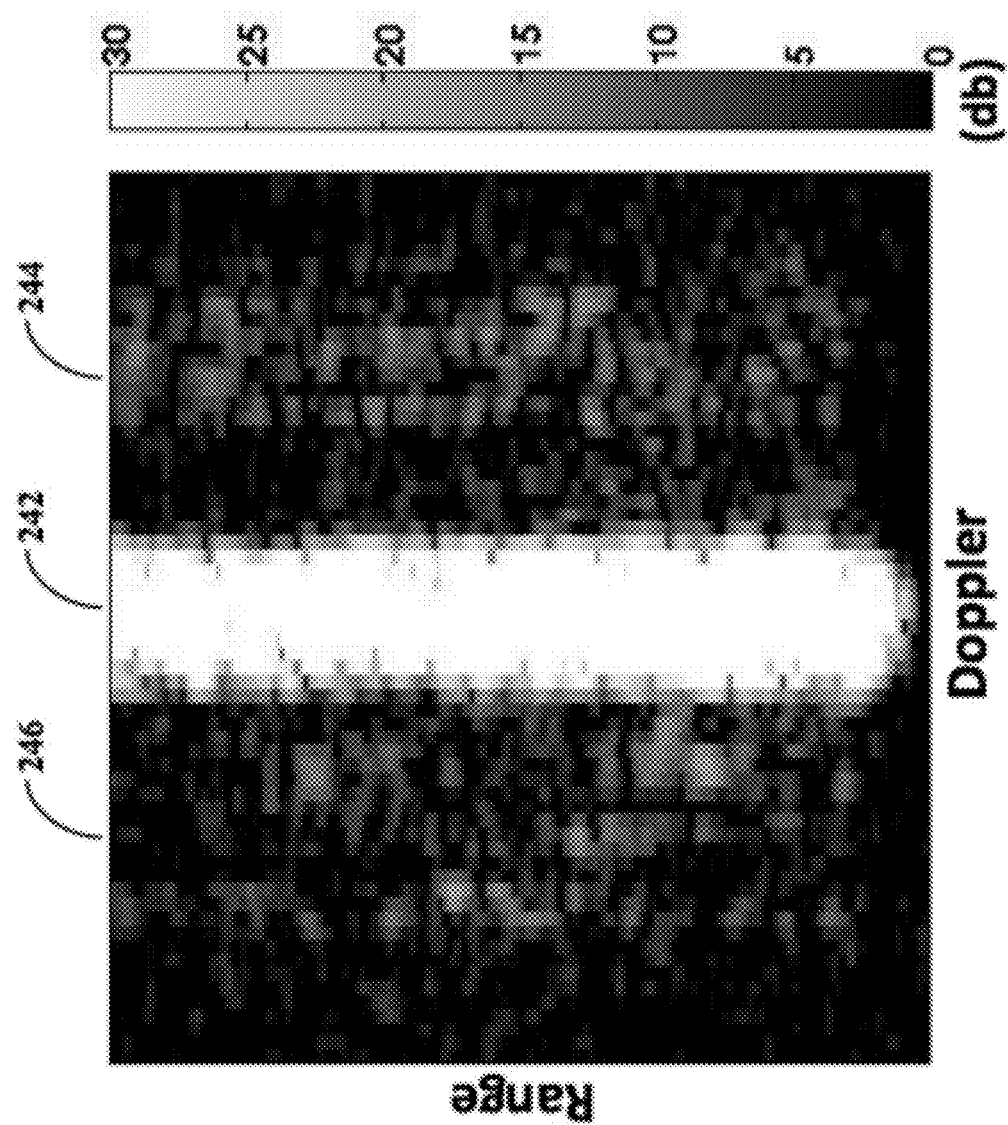
FIG. 12C is graphical view of the range-Doppler image after ICC.
Figure 12D:
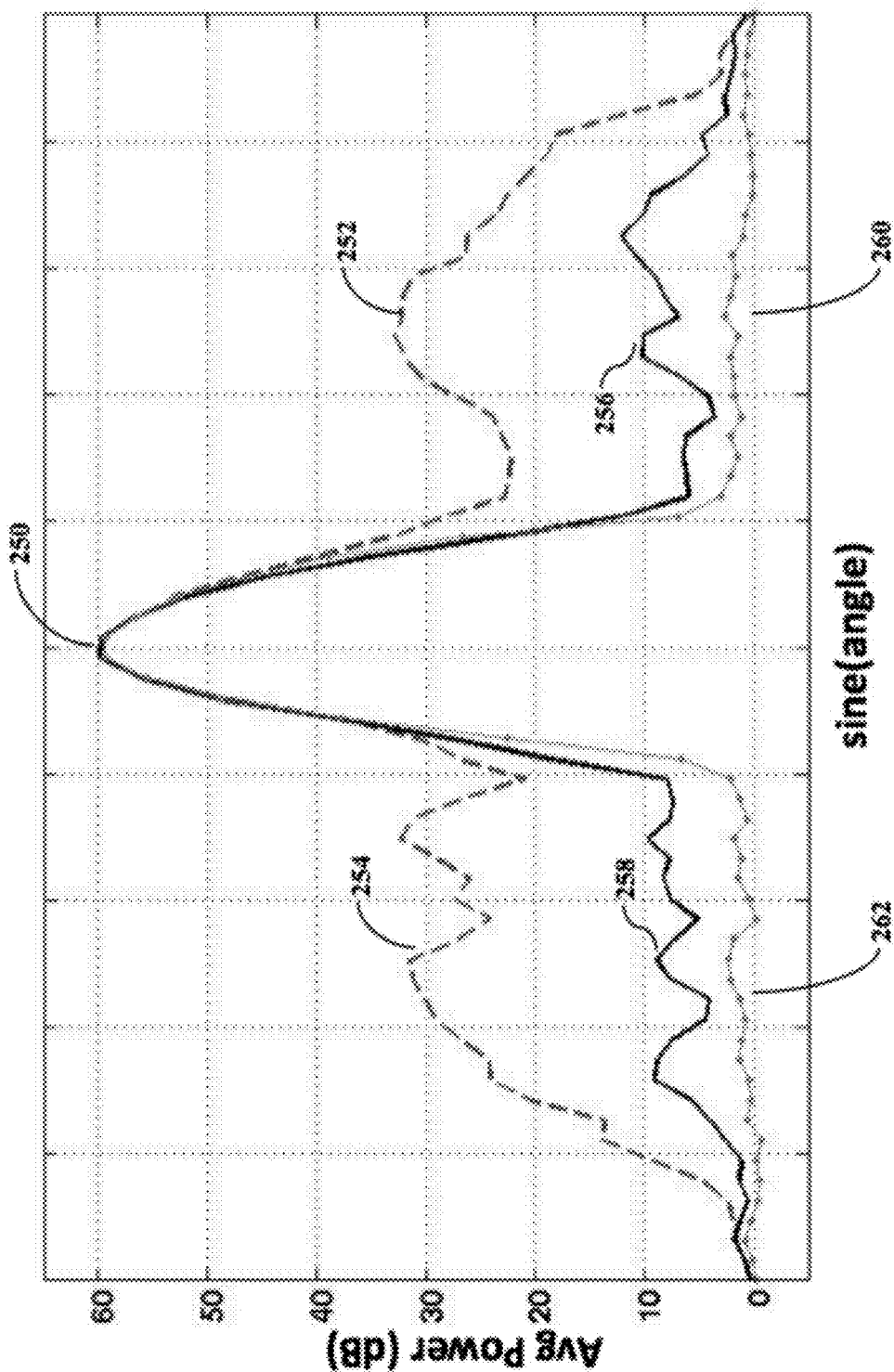
FIG. 12D is a graphical view of the average Clutter-to-Noise-Ratio before ICC, after ICC, and the optimum theoretical limit.

FIGS. 12A, 12B, 12C, and 12D show an ICC simulated example of an antenna for a linear array of 32 dipoles over a ground plane spaced by 0.5 wavelengths. FIG. 12A shows an azimuth cut of the antenna patterns where all patterns have the same peak 222, the sidelobes in the before ICC 224 and 226, and the after ICC 228 and 230. The sidelobes 224 and 226 have been reduced significantly 228 and 230. In the before ICC case, the antenna calibration errors limited the achievable sidelobes to about −30 dB. FIG. 12B shows the range-Doppler image before ICC with the mainlobe clutter Doppler 234 and the high sidelobe clutter Doppler 236 and 238. FIG. 12C shows the range-Doppler image after ICC with the mainlobe clutter Doppler 242 and the reduced sidelobe clutter Doppler 244 and 246. FIG. 12D shows the average (over range for each Doppler) clutter power versus Doppler where the peak clutter power is in the mainlobe 250, the sidelobe clutter power before ICC 252 and 254, the after ICC 256 and 258, and the optimum 260 and 262. The after ICC power 256 and 258 have been significantly reduced from the before ICC power 252 and 254 and are a few dB higher than the optimum 260 and 262. The after ICC pattern shows a significant lowering of the sidelobes. The high fidelity radar modeling software RAST-K from CAESoft Inc. was used to generate realistic clutter data. This simulation takes into account all of the radar parameters, the Digital Terrain Elevation Data, and the type of terrain to generate realistic stochastically changing ground clutter data during the simulated flight. To enhance the sidelobe clutter, a broadened transmit beam was employed. For this example, a flight over Nebraska was selected.

Figure 13A:
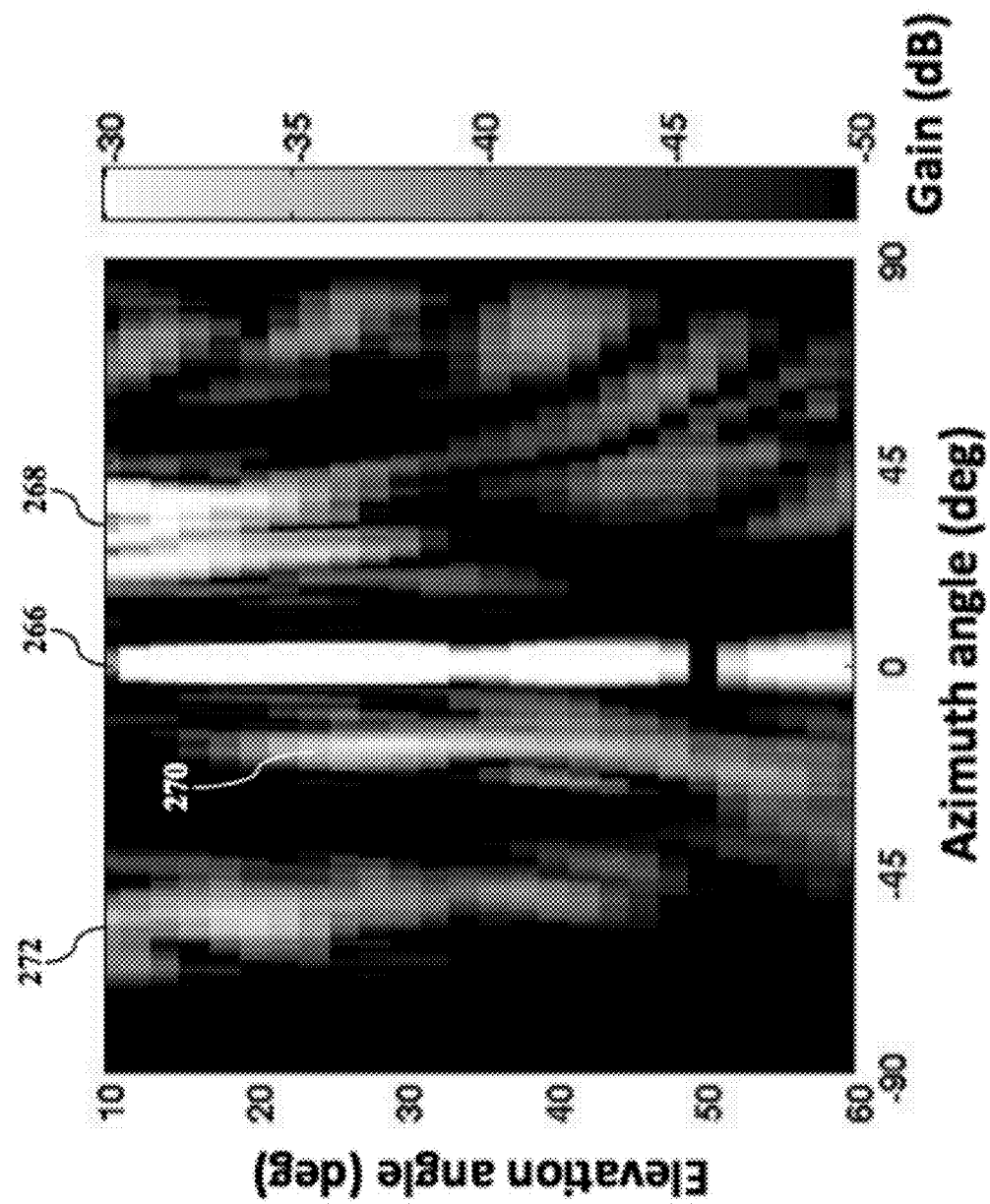
FIG. 13A is a graphical view of a 2D simulated antenna pattern before ICC for a rectangular 50×10 array of dipoles.
Figure 13B:
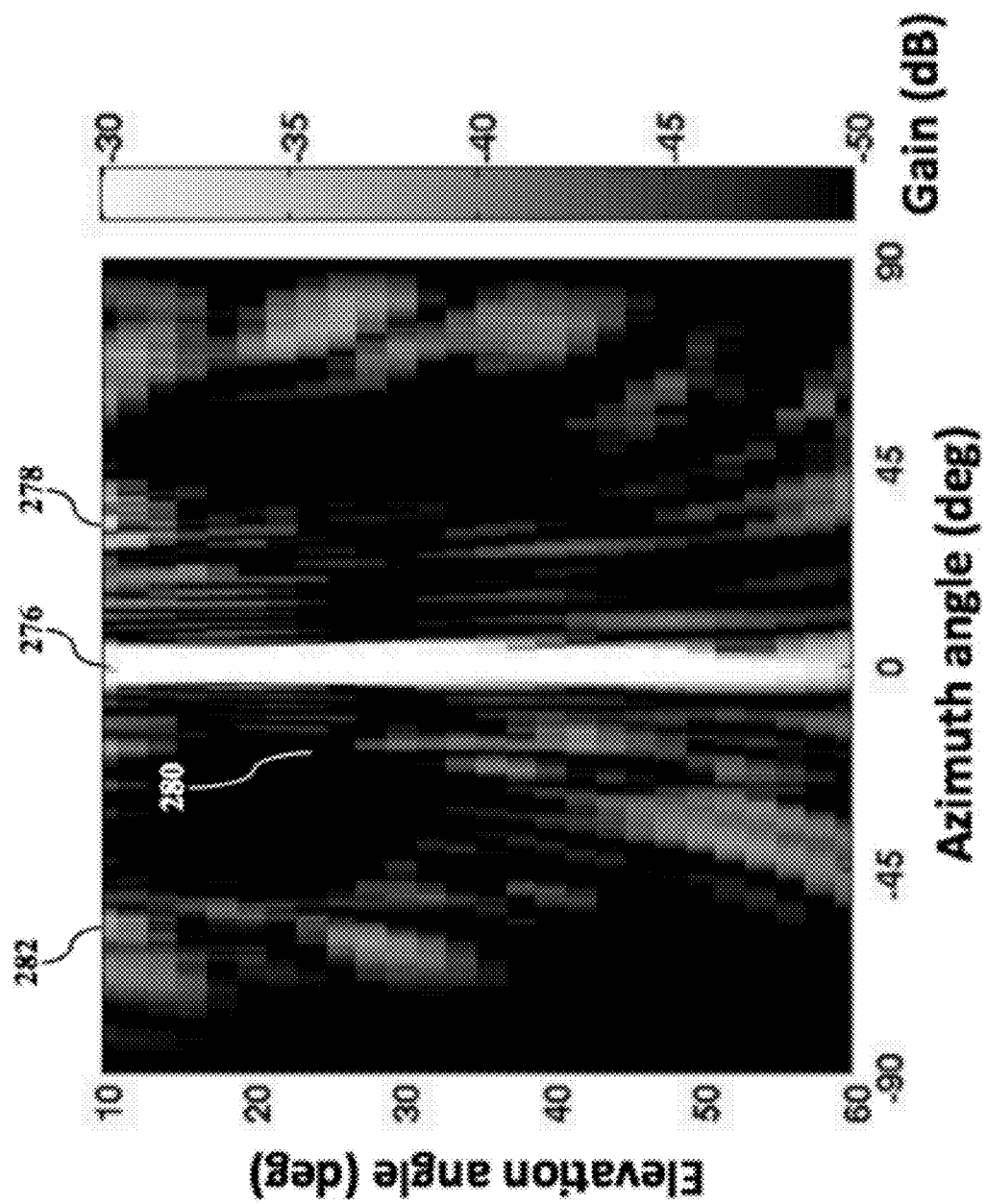
FIG. 13B is a graphical view of a 2D simulated antenna pattern with errors after ICC for a rectangular 50×10 array of dipoles.
Figure 13C:
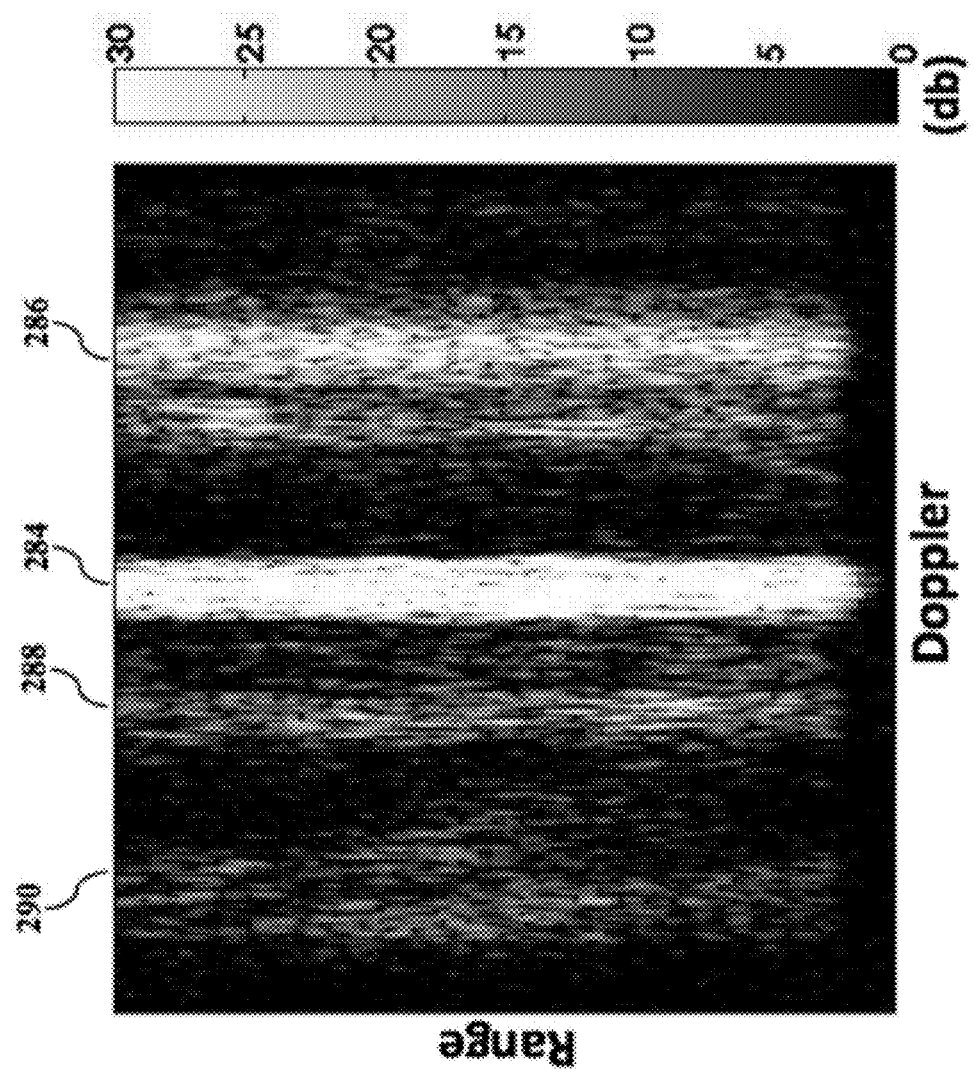
FIG. 13C is a graphical view of the range-Doppler image before ICC.
Figure 13D:
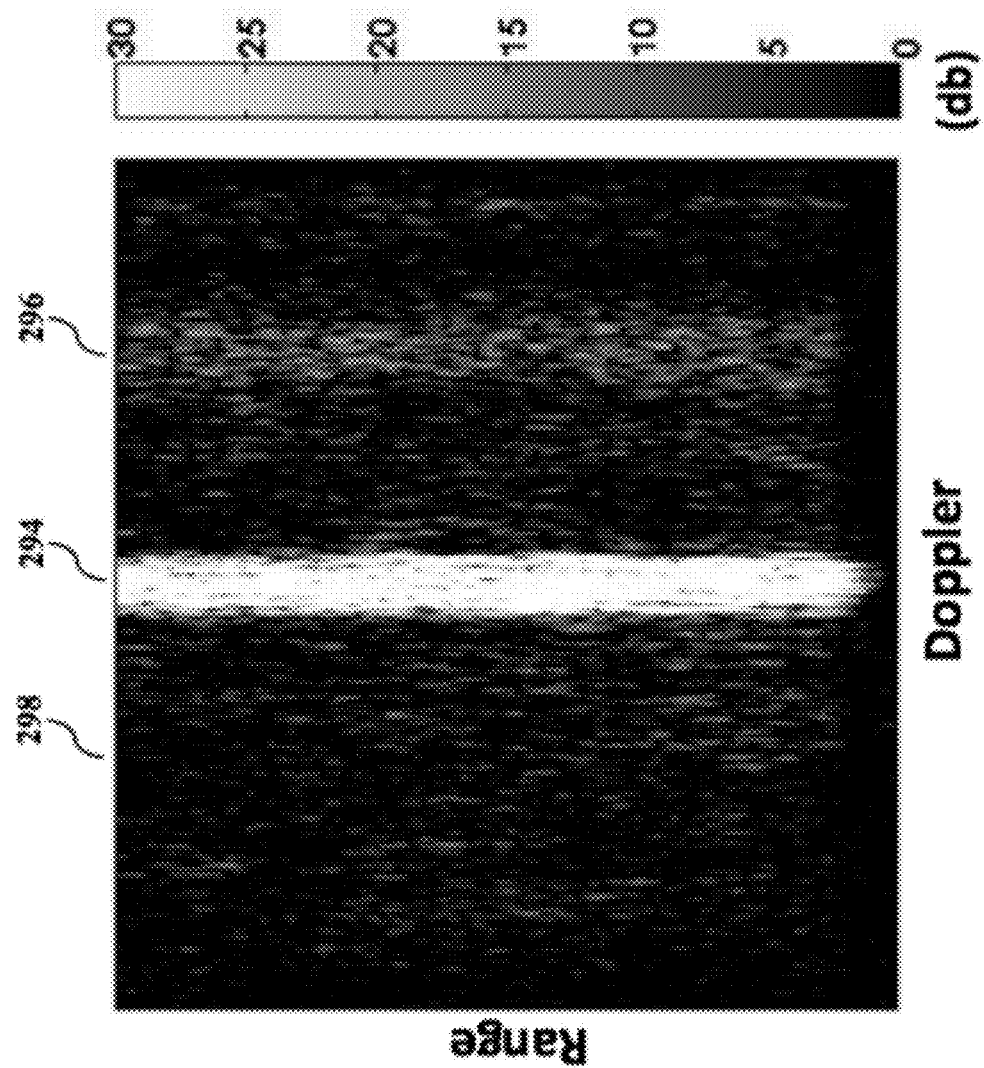
FIG. 13D is a graphical view of the range-Doppler image after ICC.
Figure 13E:
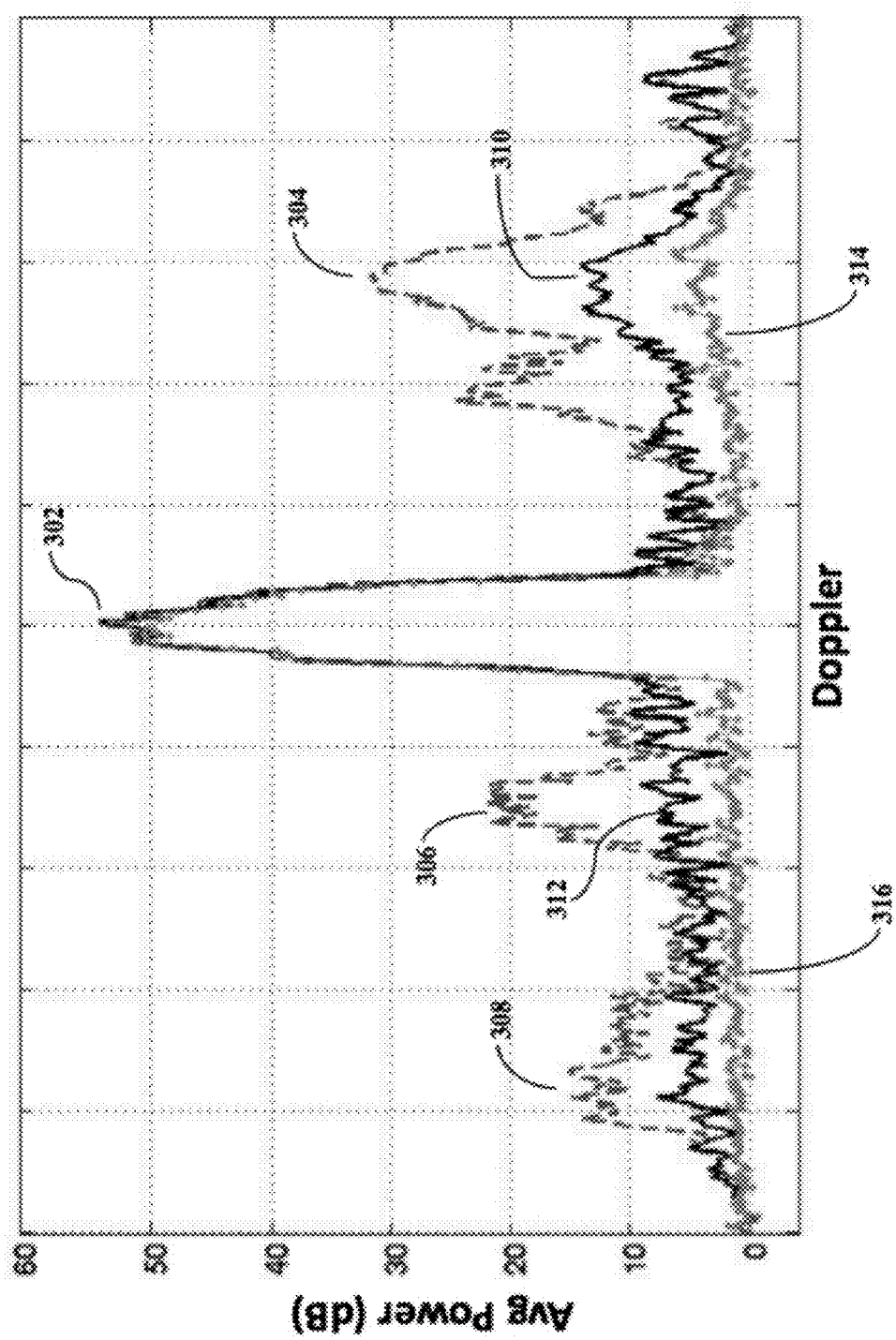
FIG. 13E is a graphical view of the average Clutter-to-Noise-Ratio before ICC after ICC, and the optimum theoretical limit.

FIGS. 13A, 13B, 13C, 13D and 13E show an ICC simulated example of a rectangular 50×10 array of dipoles over a ground plane spaced by 0.5 wavelengths mounted on the side of the plane. FIG. 13A shows the azimuth-elevation antenna pattern before ICC with mainlobe 266 and high sidelobes 268, 270, and 272. FIG. 13B shows the antenna pattern after ICC with the peak at the same location 276 and the sidelobes 268, 270 and 272 significantly reduced to 278, 280 and 282 respectively. FIG. 13C shows the range-Doppler image before ICC with the mainlobe clutter Doppler 284 and the high sidelobe clutter Doppler 286, 288, and 290. FIG. 13D shows the range-Doppler image after ICC with the mainlobe clutter Doppler 294 and the reduced sidelobe clutter Doppler 296 and 298. FIG. 13E shows the average (over range for each Doppler) clutter power versus Doppler where the peak clutter power is in the mainlobe 302, the sidelobe clutter power before ICC 304, 306 and 308, the after ICC sidelobe clutter 310 and 312, and the optimum 314 and 316. The after ICC pattern shows a significant lowering of the sidelobes. The optimum 314 and 316 can be computed because this is a simulation and the antenna pattern errors are known by the simulation. Again the high fidelity radar modeling software RAST-K from CAESoft Inc. was used to generate realistic clutter data with a flight over Nebraska.

Figure 14A:
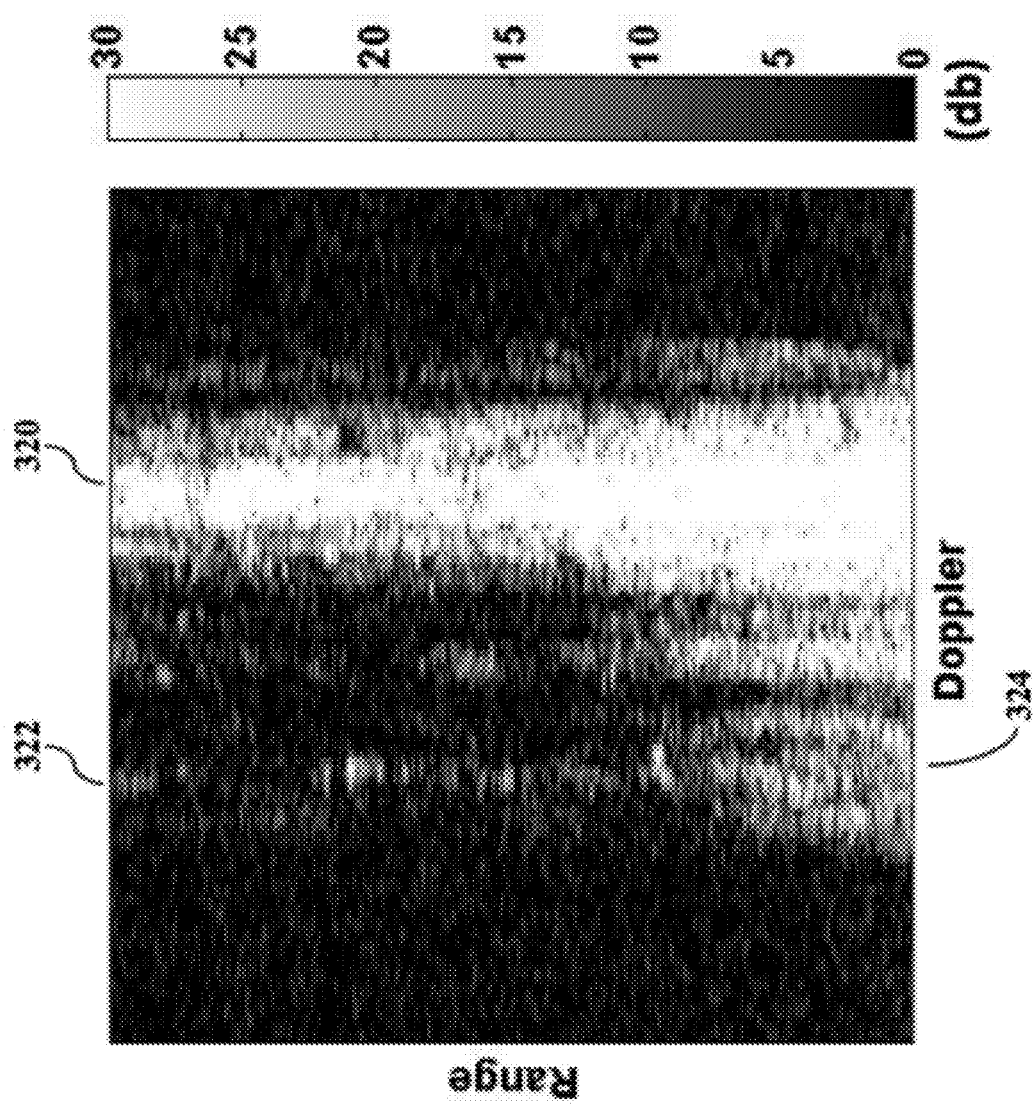
FIG. 14A is a graphical view of the range-Doppler image for a real radar mounted on the side of an aircraft before ICC.
Figure 14B:
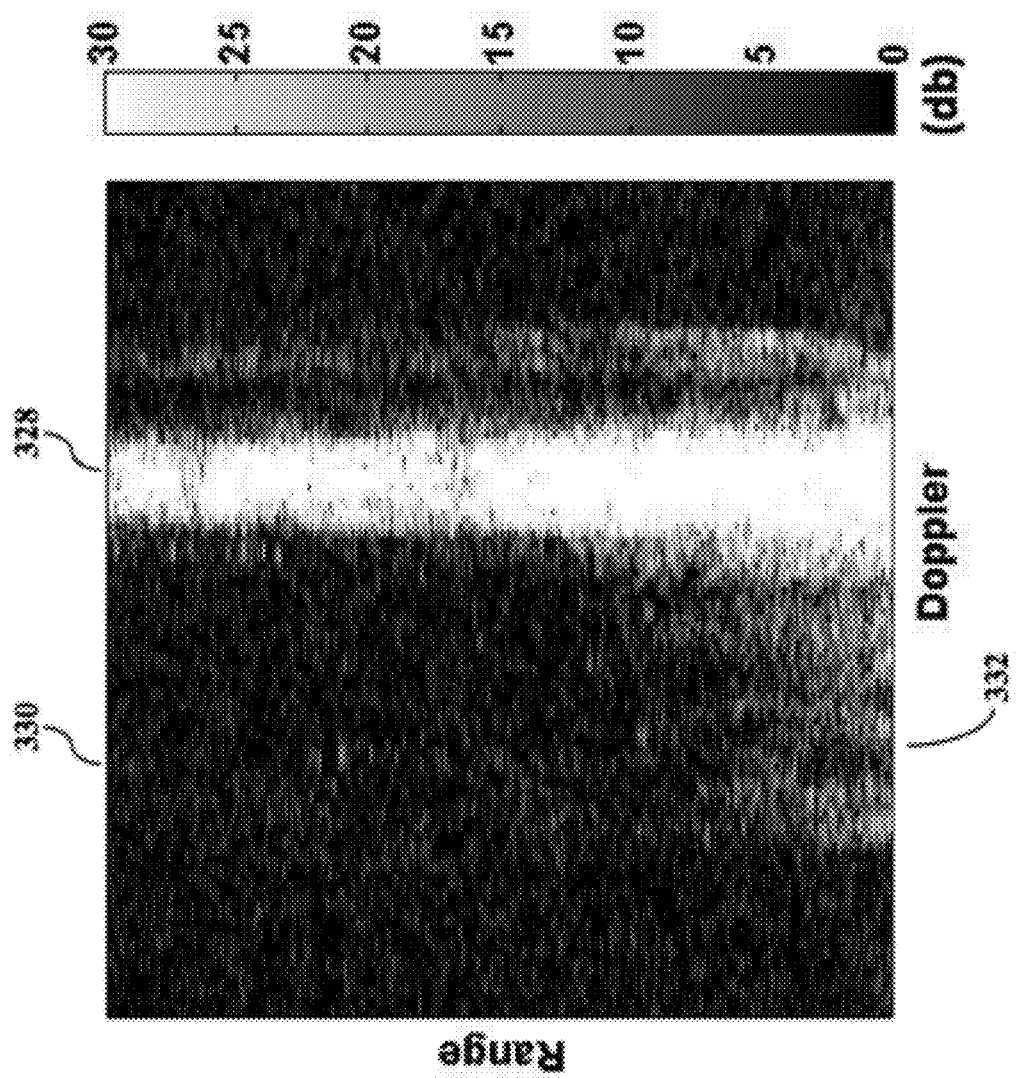
FIG. 14B is a graphical view of the range-Doppler image for a real radar mounted on the side of an aircraft after ICC.
Figure 14C:
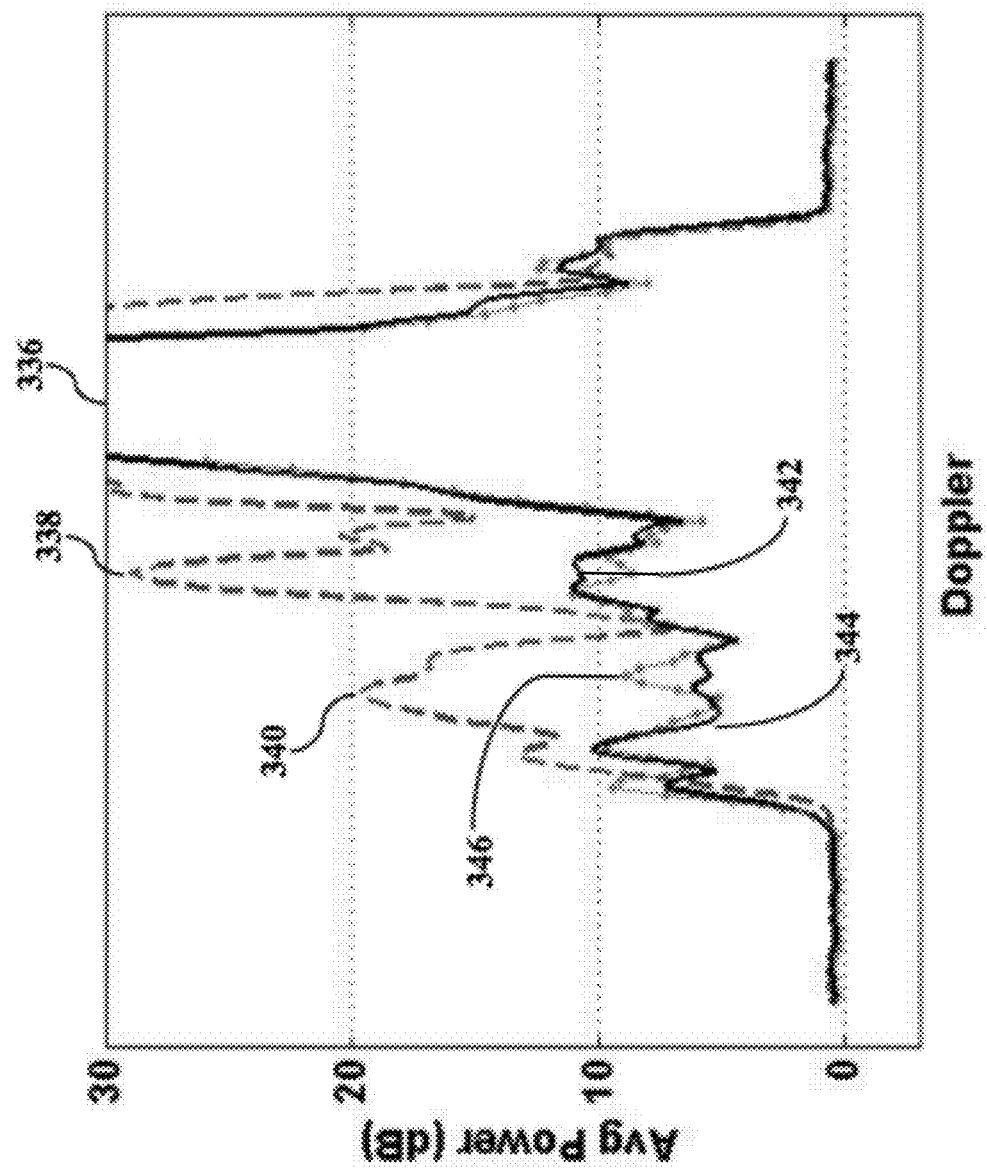
FIG. 14C is a graphical view of the average Clutter-to-Noise-Ratio before ICC after ICC, and the optimum theoretical limit.

FIGS. 14A, 14B, 14C show an ICC example from a real airborne radar mounted on the side of an aircraft. FIG. 14A shows the range-Doppler image before ICC with the mainlobe clutter Doppler 320 and the high sidelobe clutter Doppler 322 and 324. FIG. 14B shows the range-Doppler image after ICC with the mainlobe clutter Doppler 328 and the reduced sidelobe clutter Doppler 330 and 332. FIG. 14C shows the average (over range for each Doppler) clutter power versus Doppler where the peak clutter power is in the mainlobe 336, the high sidelobe clutter power before ICC 338 and 340, the after ICC sidelobe clutter power 342 and 344, and the optimum 346 which is very close to ICC 342 and 344. We can compute the optimum since for this data set all of the channels were digitized. However, we cannot compute the antenna patterns since the individual antenna element patterns are not accurately known. The fact that the sidelobe clutter has been significantly reduced by ICC verifies that the antenna pattern sidelobes have been reduced. The close agreement between the ICC 342 and 344 and the optimum 346 highlights the efficacy of the ICC algorithm. This data set also shows the stability of the ICC method in the presence of several CPIs with anomalous data due to equipment malfunction. ICC convergence was unaffected.

The following is a non-limiting example of pseudocode used by the ICC processor 122 in FIG. 10 according to one of the preferred embodiments. The embodiment represented by FIG. 7 is a straight forward deletion of the fixed beamformer 174 in the pseudocode. The embodiment in FIG. 11 where multiple beams are digitized is not included in the pseudocode. Where parameters are provided they are ones that have been shown to work well in some simulations, but may vary with the application, and other combinations of parameters are envisioned. MATLAB® style conventions are primarily used.

```
Assumed External Functions
quiescent(direction) : returns the assumed untapered beam in the specified direction based
        on ground calibration.
setRadarWeightsGetRD(w) : sets the radar beamformer weights to specified values, obtains
        a CPI of beamformed and Doppler processed data, and returns the range-
        Doppler data. Takes a full CPI of flight time to call.
Parameters
targTaper : absolute value of target taper loss in dB, e.g. 1.5 dB
p : controls relative importance of taper loss soft constraint term in objective function, e.g. 2.
target : OK to stop if this is achieved.
numBeams : number of beams used in beamspace optimization, e.g., 54. (The stochastic
        optimization is over numBeams parameters rather than the full dimension of the array,
        which significantly enhances convergence times. The beams should be pointed near the
        beam being worked on and/or at the principal sources of high residual clutter.)
spacing : width of azimuthal beam spacing in beamspace, e.g., ½ is a good choice
taper : fixed taper to put on beamspace beams, e.g. Kaiser, Chebychev, etc.
maxCPIs : maximum number of CPIs to use for fit. (Sets an upper limit on search time)
defaulta : the default value of the "a" parameter, e.g. 100 (better to overestimate)
ftol : tolerance of fluctuations in iterations should be high, e.g. 15
clutterScreen : a Range-Doppler sized matrix with ones where sidelobe clutter is and zeros
        where mainbeam clutter guard region is. Choice of mainbeam guard region is
        radar-dependant, e.g. 7 Doppler bins. The resuting beam pattern will be low in the
        clutter sidelobe region.
Main program : The stochastic method sequentially optimizes one beam at a time. The first
beam uses a tapered quiescent beam as an initial condition. Future beams extrapolate from the
previous beam as an initial condition. We call on the stochastic minimization function fminSPSA
to minimize the negative of the objective function, which is equivalent to maximizing the
objective function itself.
for each directionToFit
    T = makeBeamspaceMatrix(numBeams,spacing,taper,directionToFit);
    if defined(wv)         % Use previous beam as initial condition where available
        wv0=wv;
        starta=a;
    else
        wv0=zeros(numBeams,2);
        starta=defaulta;
    end
    [wv,a] = fminSPSA(wv0,-objFun,starta,target,maxCPIs,ftol);
    w = T*[1;complex(wv(:,1),wv(:,2))];
```

```
end
Subroutines
makeBeamspaceMatrix : This subroutine creates the beamspace and thus the transformation
matrix T between element space and a reduced dimension beamspace.
function T = makeBeamspaceMatrix(numBeams,spacing,taper,directionToFit)
    for i=1:numBeams
        T0(:,i) = taper .* quiescent(directionToFit+spacing*(i-1-(numBeams-1)/2));
    end
    T = [quiescent(directionToFit), T0];
end
objFun : This subroutine computes the objective function to be maximized. Logarithmic
preconditioning here is essential.
function val = objFun(wv)
    w = unitNorm(T*[1;complex(wv(:,1);wv(:,2)]);
    RD = setRadarWeightsAndGetRD(w);
    clutterPower = sum(abs(RD.*clutterScreen)^2);
    taperLoss = abs(w'*quiescent(directionToFit))^2;
    taperDiff = 10*log10(taperLoss/targTaper);
    val = 10*log10(taperLoss/clutterPower) - p*(taperDiff)*Heaviside(taperDiff);
end
randBernoulli : Generates m by n matrix whose entries are Bernoulli-random (either +1 or -1
with equal probability). Used by fminSPSA to approximate stochastic gradient.
function R = randBernoulli(m,n)
    R = 2*round(rand(m,n))-1;
end
fminSPSA : This is the heart of the stochastic optimization method. The internal parameters set
below have worked well but may be subject to modification,
    alpha, gamma, and A are set based on standard SPSA recommended values.
    "c" is set to 10 times std dev of objective function
    oldweight set so new and previous grad ests are equally weighted.
    startAvgs is number of grad ests to average for initial grad estimate (for "a" scaling)
    shrinkFactor determines scaling of "a" in initial loop
    nTmpShrink and atmpMin regulate further temporary "a" shrinking as needed
function [x,a] = fminSPSA(x,f,a,target,maxcalls,ftol)
    % Internal parameters:
    alpha = 0.602;
    gamma = 0.101;
    A = maxCPIs/30;
    oldweight = 1;
    startAvgs = 20;
    shrinkFactor = 0.6;
    nTmpShrink = 5;
    atmpMin = 0.005;
    %%
    fcalls=0;
    k = 1;
    for i=1:20
        fval0(i)=f(x);
        fcalls=fcalls+1;
    end
    fnew = mean(fval0);
    fmin=fnew;
    if fnew < target, return; end
    c = 10*std(fval0);
    for i=1:startAvgs
        delta = randBernoulli(size(x));
        ck = c/(k^gamma);
        fp = f(x+ck*delta);
        fm = f(x-ck*delta);
        fcalls = fcalls + 2;
        grad = grad + (fp-fm)./(2*ck* delta);
    end
    grad=grad/startAvgs;
    a = a/shrinkFactor;
    do
        a = a*shrinkFactor;
        ak = a/((k+A)^alpha);
        xnew = x - ak*grad;
        fnew = f(xnew);
        fcalls = fcalls + 1;
        fmin = min(fmin, fnew);
    while (fnew > fmin+ftol) AND (fcalls < maxcalls));
    i = 0;
    do while ((fcalls < maxcalls) AND (fnew > target))
        i = i + 1;
        n = 0;
        atmp = 1;
        do
            if ((n>nTmpShrink) && (atmp > atmpMin))
                atmp = atmp*0.9;
```

```
            end
            k=k+1;
            n=n+1;
            delta = randBernoulli(size(x));
            ck = c/(k^gamma);
            fp = f(x+ck*delta);
            fm = f(x-ck*delta);
            fcalls = fcalls + 2;
            newgrad = (fp-fm)./(2*ck* delta);
            grad = (oldweight*grad + newgrad)/(oldweight+1);
            ak = a/((k+A)^alpha);
            xnew = x - ak*grad;
            fnew = f(xnew);
            fcalls = fcalls + 1;
            fmin = min(fmin, fnew);
        while ((fcalls < maxcalls) AND (fnew > fmin+ftol))
        x = xnew;
    end
end
```

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for calibrating a phased array antenna comprising:
    combining a plurality of receive signals generated by a plurality of antenna elements in a phased array antenna to generate a receive beam, wherein a gain of each receive signal is determined according to a respective beamformer weight in a plurality of beamformer weights for the receive beam and wherein a phase of each receive signal to the combination is determined according to a respective steering value in a plurality of steering values for the receive beam;
    processing the receive beam to generate a main range-Doppler image;
    measuring an average of a sidelobe clutter power in the range-Doppler image for a plurality of ranges;
    determining a value of an objective function that is responsive to the average of the sidelobe clutter power; and
    modifying the plurality of beamformer weights and repeating the step of determining the value of the objective function until a maximum value of the objective function is determined.

2. The method of claim 1 wherein the objective function comprises:
    a numerator defined as a square of an inner product of a Hermitian transpose of each of the beamformer weights and each of the steering values; and
    a denominator defined as the average of the sidelobe clutter power.

3. The method of claim 2 wherein the objective function is a logarithmic value of the numerator divided by the denominator.

4. The method of claim 2 wherein the objective function is an inverse hyperbolic sign value of the numerator divided by the denominator.

5. The method of claim 2 wherein the objective function further comprises a soft constraint term responsive to each of the beamformer weights and each of the steering values, the soft constraint term predetermined to yield a receive beam having a particular receive beam property.

6. The method of claim 5 wherein the soft constrain term is a piecewise linear function evaluated at a logarithm of the inner product of the Hermitian transpose of each of the beamformer weights and each of the steering values.

7. The method of claim 1 wherein the plurality of the receive signals are responsive to a plurality of pulses received at the phased array antenna, the plurality of pulses grouped within a plurality of coherent processing intervals (CPIs), each CPI including more than a one pulse of the plurality of pulses wherein each of the more than a one pulse in any one of the plurality of CPIs have substantially equal temporal spacing and modulate a carrier frequency.

8. The method of claim 7 wherein the carrier frequency of one of the plurality of pulses received at the phased array antenna is shifted by a frequency difference from a transmit carrier frequency modulated by the one of the plurality of pulses transmitted from the phased array antenna, the frequency difference being proportional to a velocity of the phased array antenna to an irradiated object.

9. The method of claim 7 wherein maximizing the objective function includes executing, for each of the CPIs, a Simultaneous Perturbation Stochastic Approximation (SPSA) method to create a new set of beamformer weights, the SPSA method comprising:
    setting an SPSA-c parameter to a value equal to or greater than a standard deviation of the objective function, the SPSA-c parameter determining a scale of finite differences used in the SPSA method, the standard deviation measured over a plurality of CPIs; and
    iteratively adjusting an SPSA-a parameter by setting the SPSA-a parameter to be equal to, or greater than a large gradient scale number and repeatedly reducing the SPSA-a parameter by a gradient factor for one or more reduction steps unless a new objective function value determined after a reduction step is greater by a gradient improvement value than a previous objective function value determined before the reduction step, the SPSA-a parameter determining a scale of a gradient descent used in the SPSA method.

10. The method of claim 7 wherein for a stability number of CPIs, a new set of beamformer weights is discarded if execution of a Simultaneous Perturbation Stochastic Approximation method decreases the objective function by a threshold percentage.

11. The method of claim 1 wherein modifying the plurality of beamformer weights includes modifying a one or more beamspace parameters in response to determining the value of the objective function, each of the plurality of beamformer weights determined by a combination of a proportional value for each of the one or more beamspace parameters.

12. The method of claim 11 wherein the combination modifies more than one of the beamformer weights by a taper function.

13. The method of claim 12 wherein the taper function includes a Kaiser taper function.

14. The method of claim 1 wherein determining the value of the objective function includes using the plurality of beamformer weights from a nearby look direction as an initial condition, the nearby look direction corresponding to the plurality of steering values that steer the receive beam to an adjacent azimuth direction.

15. The method of claim 1 further comprising forming a plurality of combination beams, each combination beam comprising a linear combination of the receive beam with a first set of the plurality of steering values and at least one other beam, each of the at least one other beam having another set of the plurality of steering values, each combination beam forming a combination image, each combination image being processed with an adaptive processor to form the main range-Doppler image.

16. A computer program product for iterative clutter calibration, the computer program product comprising:
a non-transitory computer readable storage medium having computer readable program code embodied therewith, the computer readable program code comprising:
computer readable program code configured to measure an average of a sidelobe clutter power in a range-Doppler image for a plurality of ranges;
computer readable program code configured to determine a value of an objective function that is responsive to the average of the sidelobe clutter power; and
computer readable program code configured to modify a plurality of beamformer weights and configured to repeat the step of determining the value of the objective function until a maximum value of the objective function is determined.

17. The computer program product of claim 16 wherein the computer readable program code further comprises computer readable program code configured to determine the maximum value of the objective function by executing a Simultaneous Perturbation Stochastic Approximation (SPSA) method, the objective function comprising a numerator defined as a square of an inner product of a Hermitian transpose of each of a beamformer weight and each steering value in a plurality of steering values, each beamformer weight determining a gain of a respective receive signal generated by a respective antenna element in a phased array antenna, each steering value determining a phase of the respective receive signal and a denominator defined as the average of the sidelobe clutter power,
the SPSA method comprising:
setting an SPSA-c parameter to a value equal to or greater than a standard deviation of the objective function, the SPSA-c parameter determining a scale of finite differences used in the SPSA method; and
iteratively adjusting an SPSA-a parameter by setting the SPSA-a parameter to be equal to, or greater than a large gradient scale number and repeatedly reducing the SPSA-a parameter by a gradient factor for a one or more reduction steps unless a new objective function value determined after a reduction step is greater by a gradient improvement value than a previous objective function value determined before the reduction step, the SPSA-a parameter determining a scale of a gradient descent used in the SPSA method.

18. The computer program product of claim 17 wherein the computer readable program code further comprises computer readable program code configured to discard a new set of beamformer weights if after a stability number of coherent processing intervals, the execution of an SPSA method decreases the objective function by a threshold percentage.

19. The computer program product of claim 17 wherein the computer readable program code further comprises computer readable program code configured to modify the plurality of beamformer weights including modifying a one or more beamspace parameters in response to determining the value of the objective function, each beamformer weight determined by a combination of a proportional value for each of the one or more beamspace parameters.

20. The computer program product of claim 17 wherein the computer readable program code further comprises computer readable program code configured to use the beamformer weights from a nearby look direction corresponding to a set of steering values that steer the vector to an adjacent azimuth direction as an initial set of beam former weights for the SPSA method.

21. An apparatus for iterative clutter calibration comprising:
a storage module configured to store a plurality of beamformer weights for a beamformer;
an image processor configured to generate a main range-Doppler image from an at least one receive beam supplied from the beamformer; and
a calibration processor configured to determine a value of an objective function that is responsive to an average of a sidelobe clutter power and the beamformer weights, the calibration processor configured to replace the plurality of beamformer weights in the storage module with a plurality of new beamformer weights that maximizes the value of the objective function.

22. The apparatus of claim 21 wherein the at least one receive beam comprises a plurality of combination beams, each combination beam comprises a linear combination of a first beam with a first set of a plurality of steering values and at least one other beam having another set of the plurality of steering values, the image processor is configured to provide a plurality of combination images from the plurality of combination beams, and an adaptive processor is configured to form a main range-Doppler image from the plurality of combination images.

23. A method for iterative clutter calibration comprising:
measuring an average of a sidelobe clutter power in a range-Doppler image for a plurality of ranges;
determining a value of an objective function that is responsive to an average of the sidelobe clutter power; and
modifying a plurality of beamformer weights and repeating the step of determining the value of the objective function until a maximum value of the objective function is determined, each beamformer weight determining a gain and phase of a respective antenna element in an antenna system.

* * * * *